(12) United States Patent
Kovacs et al.

(10) Patent No.: US 7,887,176 B2
(45) Date of Patent: Feb. 15, 2011

(54) IMAGING ON FLEXIBLE PACKAGING SUBSTRATES

(75) Inventors: Gregory Joseph Kovacs, Webster, NY (US); Steven E. Ready, Los Altos, CA (US); Allen W. Denham, Williamson, NY (US); Lawrence Floyd, Jr., Rochester, NY (US); James Fallon, Jr., Rochester, NY (US); Jennifer L. Belelie, Oakville (CA); Barkev Keoshkerian, Thornhill (CA); Peter Gordon Odell, Mississauga (CA); Christopher A. Wagner, Toronto (CA)

(73) Assignee: Xerox Corporation, Norwalk, CT (US)

(*) Notice: Subject to any disclaimer, the term of this patent is extended or adjusted under 35 U.S.C. 154(b) by 106 days.

(21) Appl. No.: 12/121,386

(22) Filed: May 15, 2008

(65) Prior Publication Data

US 2008/0218570 A1 Sep. 11, 2008

Related U.S. Application Data

(63) Continuation-in-part of application No. 11/427,172, filed on Jun. 28, 2006.

(51) Int. Cl.
*B41J 2/01* (2006.01)

(52) U.S. Cl. .............. 347/102; 347/88; 347/99; 347/100; 106/31.61; 106/31.62; 106/31.63; 106/31.29

(58) Field of Classification Search .......... 347/10–104; 156/272.2; 106/31.61–31.63, 31.29
See application file for complete search history.

(56) References Cited

U.S. PATENT DOCUMENTS

| | | | |
|---|---|---|---|
| 3,653,932 A | 4/1972 | Berry et al. | |
| 4,390,369 A | 6/1983 | Merritt et al. | |
| 4,484,948 A | 11/1984 | Merritt et al. | |
| 4,684,956 A | 8/1987 | Ball | |
| 4,851,045 A | 7/1989 | Taniguchi | |
| 4,889,560 A | 12/1989 | Jaeger et al. | |
| 5,006,170 A | 4/1991 | Schwarz et al. | |
| 5,151,120 A | 9/1992 | You et al. | |
| 5,372,852 A | 12/1994 | Titterington et al. | |
| 5,389,958 A * | 2/1995 | Bui et al. | 347/103 |
| 5,496,879 A | 3/1996 | Griebel et al. | |
| 5,804,671 A | 9/1998 | Dones et al. | |
| 5,889,076 A | 3/1999 | Dones et al. | |
| 6,239,189 B1 | 5/2001 | Narayan et al. | |
| 6,316,517 B1 | 11/2001 | Dones et al. | |
| 6,467,897 B1 | 10/2002 | Wu et al. | |
| 6,550,905 B1 * | 4/2003 | Deckers | 347/100 |
| 6,586,492 B1 | 7/2003 | Caiger et al. | |
| 6,872,243 B2 * | 3/2005 | Breton et al. | 106/31.29 |

(Continued)

OTHER PUBLICATIONS

Breuer, Thomas E., "Dimer Acids", Kirk-Othmer Encyclopedia of Chemical Technology, vol. 8, 4th Ed., 1993, pp. 223-237.

*Primary Examiner*—Matthew Luu
*Assistant Examiner*—Rut Patel
(74) *Attorney, Agent, or Firm*—Fay Sharpe LLP

(57) ABSTRACT

Methods and devices for forming, such as by printing, high quality, high throughput, ultraviolet curable gel ink images on flexible substrates for packaging applications are disclosed. The methods and devices have excellent image quality and do not require pinning of the ink during color printing or nitrogen inerting during curing.

17 Claims, 8 Drawing Sheets
(7 of 8 Drawing Sheet(s) Filed in Color)

U.S. PATENT DOCUMENTS

| | | |
|---|---|---|
| 6,896,937 B2 | 5/2005 | Woudenberg |
| 7,276,614 B2 | 10/2007 | Toma et al. |
| 7,279,587 B2 | 10/2007 | Odell et al. |
| 2003/0036587 A1 | 2/2003 | Kozak |
| 2003/0128264 A1* | 7/2003 | Ishikawa et al. ............ 347/102 |
| 2004/0041893 A1* | 3/2004 | Hoshino .................... 347/102 |
| 2007/0120908 A1 | 5/2007 | Odell et al. |
| 2007/0120909 A1 | 5/2007 | Belelie et al. |
| 2007/0120910 A1* | 5/2007 | Odell et al. ................... 347/88 |
| 2007/0120925 A1 | 5/2007 | Belelie et al. |

* cited by examiner

IMAGING ON FLEXIBLE PACKAGING SUBSTRATES

CROSS-REFERENCE TO RELATED APPLICATIONS

This application is a continuation-in-part application of U.S. patent application Ser. No. 11/427,172, filed Jun. 28, 2006. This application is also related to U.S. patent application Ser. No. 11/290,121, filed Nov. 30, 2005; U.S. patent application Ser. No. 11/290,202, filed Nov. 30, 2005; and U.S. patent application Ser. No. 12/107,520, filed Apr. 22, 2008. All four of these applications are hereby fully incorporated herein by reference.

BACKGROUND

The present disclosure generally relates to methods and devices for forming images on flexible substrates. In this regard, this disclosure relates to forming or printing images on flexible surfaces such as those used in packaging and other applications, through the use of curable phase change inks.

Conventional ink jet printing systems, such as drop-on-demand or continuous systems, are known in the art. In drop-on-demand systems, a droplet is expelled from the orifice of a printhead directly to a position on a recording medium, such as paper. A droplet is not formed or expelled unless it is to be placed on the recording medium.

An example of such a drop-on-demand system is known as thermal ink jet (TIJ), or bubble jet. It produces high velocity droplets by passing a current pulse through a resistive layer within the ink passageway near the nozzle, causing the ink vehicle in the immediate vicinity to vaporize and expel droplets of ink from the nozzle.

Another example of a drop-on-demand system is piezoelectric ink jet (PIJ). In such a system, the printhead has as its major components an ink filled channel or passageway having a nozzle on one end and a piezoelectric transducer near the other end. The piezoelectric transducer produces pressure pulses which expel drops of ink from the nozzle.

A further example of a drop-on-demand system is known as acoustic ink printing. As is known, an acoustic beam exerts a radiation pressure against objects upon which it impinges. Thus, when an acoustic beam impinges on a free surface (i.e., liquid/air interface) of a pool of liquid from beneath, the acoustic pressure which it exerts against the surface of the pool may reach a sufficiently high level to release individual droplets of liquid from the pool, despite the restraining force of surface tension. Focusing the beam on or near the surface of the pool intensifies the acoustic pressure it exerts for a given amount of input power.

Printing on flexible packaging substrates may be useful for various applications. The term "flexible" is intended to refer to thin film or foil materials which are generally supplied in a roll format, printed on, and then rolled up again after printing. Exemplary flexible packaging substrates include plastics, metal foils, laminates thereof, and laminates with paper. Flexible packaging substrates can be used, for example, to package food, pharmaceuticals, cosmetics, or tobacco.

Currently, digital printing on flexible packaging substrates is often done with liquid toners or ultraviolet-curable inks. Liquid toners suffer from image robustness problems and are not durable. For example, they have poor scratch, rub, and smear resistance. Conventional UV-curable inks have low viscosity. As a result, they tend to flow laterally, especially on non-porous flexible packaging substrates, resulting in irregular dot growth. This lateral spreading can be decreased by pinning, which is a partial cure of the UV ink to increase its viscosity. In addition to prevention of lateral spreading, pinning is often done after printing each color in color images, so that the next color will impinge onto a stable ink surface and not mix and/or flow with the ink printed previously. The UV lamps required for pinning represent additional equipment cost which increases the cost of the printed flexible substrate. The pinning lamps also require additional power which also increases the cost of the printed substrate. Moreover the space required for the pinning lamps lengthens the print zone or waterfront required, which results in a larger printer needing more floor space. The ability to fix the entire image in a final cure step downstream from the print zone is also beneficial since it reduces the chance of stray UV light from a neighboring pinning lamp entering the printhead and prematurely curing the ink, resulting in printhead fouling. Additionally, pinning is a complex process with a narrow operating window requiring sufficient cure to render the ink immobile, but ink that is overcured in the pinning step offers poor adhesion for the next color. This complexity is compounded as the first colors deposited are exposed to additional pinning or curing cycles as subsequent colors are deposited and pinned.

Additional means that allow for forming images or printing on flexible substrates are still desired.

BRIEF DESCRIPTION

The present application discloses, in various exemplary embodiments, devices and processes for forming or printing images, such as color images, on flexible packaging substrates. Among other characteristics, the resulting images have high image quality with well registered colors. Methods of making and using such images are also disclosed.

In some embodiments, a method for forming an image on a flexible packaging substrate is disclosed which comprises:
   melting a radiation-curable gel based phase change ink;
   depositing at least one drop of the melted ink on the flexible packaging substrate in a pattern to form an image;
   allowing the ink to gel on the substrate; and
   curing the ink.

The ink may be cured in an ambient atmosphere. The ink may also be cured by exposing the ink to ultraviolet light.

The ink may be heated until the ink has a viscosity of from about 5 to about 15 millipascal-seconds or to a temperature of from about 70° C. to about 95° C.

The flexible packaging substrate may comprise a metal foil, a plastic film, laminates thereof, or laminates with paper. In some specific embodiments, the flexible substrate comprises aluminum foil, polyester film, or polypropylene film.

In some embodiments, the radiation-curable gel based phase change ink does not contain a photoinitiator; and the ink is cured by exposing the ink to electron beam radiation.

In other embodiments, a method for forming an image on a flexible packaging substrate is disclosed which comprises:
   heating an actinic radiation-curable gel based phase change ink to form a liquid;
   depositing one or more droplets of the liquid ink onto a flexible packaging substrate in an imagewise pattern;
   allowing the liquid ink of the imagewise pattern to solidify to form a gel; and
   curing the actinic radiation-curable gel ink.

In other embodiments, a method for forming an image on a flexible packaging substrate is disclosed which comprises:
   heating an ultraviolet-curable gel based phase change ink to form a liquid;
   depositing one or more droplets of the liquid ink onto a flexible packaging substrate in an imagewise pattern;

allowing the liquid ink of the imagewise pattern to solidify to form a gel; and curing the ultraviolet-curable gel ink.

In still other embodiments, an ultraviolet-curable gel ink printing system is disclosed which comprises:

an unwind roll, a rewind roll, and a drive;

at least one heat source configured to melt an ultraviolet-curable gel based phase change ink;

at least one printhead configured to deposit one or more droplets of the melted ink in an imagewise pattern onto an associated flexible packaging substrate; and an ultraviolet light source configured to cure the ink after the ink is deposited and gelled on the associated flexible packaging substrate.

The at least one heat source can be configured to heat the ink to at least 70° C. The ultraviolet light source may be located in a curing zone that is not configured to provide an inert atmosphere. The at least one printhead may be a piezoelectric printhead. The system may be configured to fully cure the ink at throughput speeds of 200 feet per minute or greater. The printing system may also be configured to deposit one or more droplets of different colors and has no ultraviolet light source configured to cure droplets of one color prior to depositing droplets of another color.

Images made by the methods and devices described above are also disclosed.

These and other non-limiting characteristics of the disclosure are more particularly disclosed below.

BRIEF DESCRIPTION OF THE FIGURES

The patent or application file contains at least one drawing executed in color. Copies of this patent or patent application publication with color drawing(s) will be provided by the Office upon request and payment of the necessary fee.

The following is a brief description of the drawings, which are presented here for purposes of illustrating various aspects of embodiments of the present disclosure and not to be limiting features thereof.

FIG. 12 is a color photograph of two phase change inks printed on plain paper.

FIG. 13 is a color photograph of two phase change inks printed on glossy paper.

FIG. 14 is a color photograph of two phase change inks printed on polyester substrate.

FIG. 15 is a color photograph of two phase change inks printed on aluminum substrate.

FIG. 16 is a color photograph of two phase change inks printed on polypropylene substrate.

DETAILED DESCRIPTION

Figure 1:
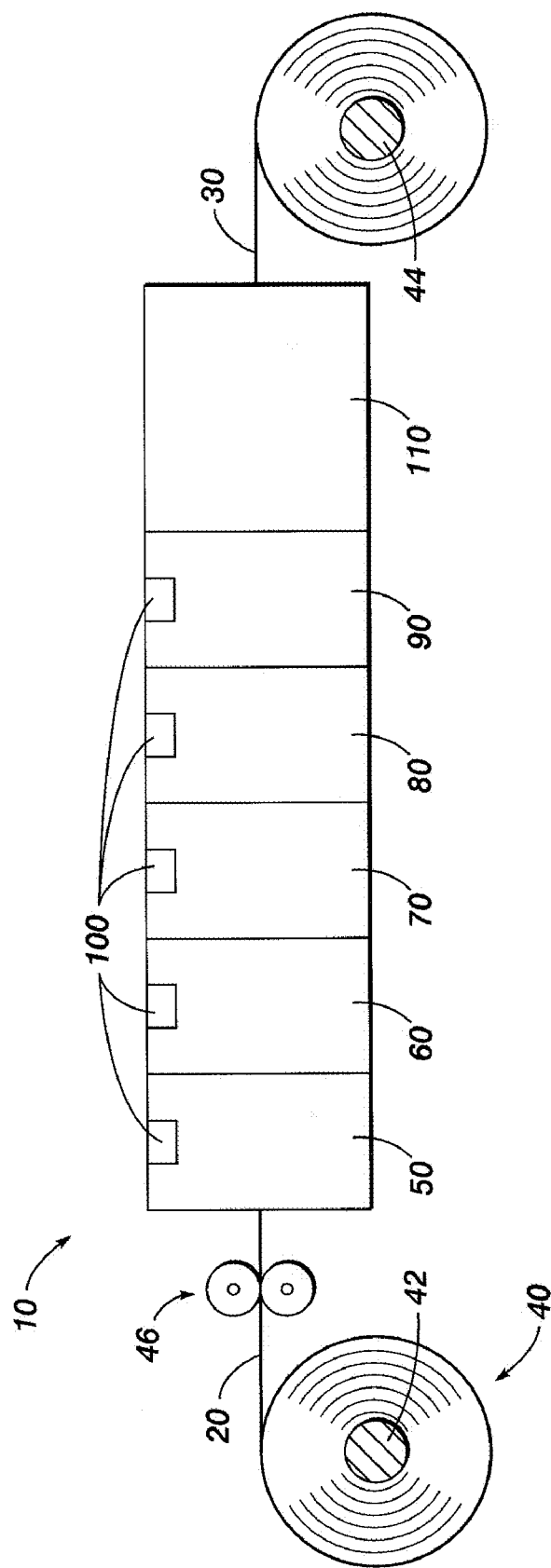
FIG. 1 is one embodiment of a printing system of the present disclosure.

High image quality in inkjet printing onto flexible packaging substrates, such as polyester, polypropylene, and aluminum foil, can be significantly improved by the use of radiation curable gel based phase change inks. Phase change inks are generally solid at ambient temperatures, but liquid at elevated temperatures. Phase change inks are desirable for ink jet printers because they remain in a solid phase at room temperature during shipping, long term storage, and the like. In addition, the problems associated with nozzle clogging as a result of ink evaporation with liquid ink jet inks are largely eliminated, thereby improving the reliability of the ink jet printing. Further, when phase change ink droplets are applied directly onto the flexible packaging substrate, the droplets solidify immediately upon contact with the substrate, so that migration of ink on the substrate is prevented and dot quality is improved.

The phrase "gel-based" refers to a property of some phase change inks in that they undergo a sharp increase in viscosity over a narrow temperature range above room temperature, and freeze to a gel-like consistency which is retained as the inks are cooled further to room temperature. For example, some phase change inks which may be suitable for use in the devices and methods of the present disclosure have a viscosity which changes by a factor of about $10^4$ to about $10^9$ over a temperature change of only about 20 to about 40 degrees Celsius.

The phrase "radiation curable" refers to the ability of the phase change ink to be cured so that it becomes permanently fixed to the substrate. All forms of curing upon exposure to a radiation source are contemplated, including light and heat sources in the presence or absence of initiators. Exemplary radiation curing routes include, but are not limited to, curing using ultraviolet (UV) light, for example having a wavelength of about 200 to about 400 nm, or more rarely using visible light, curing using electron beam radiation, curing using thermal curing, and appropriate combinations thereof.

Radiation curable gel based phase change inks generally comprise at least one curable monomer, at least one phase change agent, and a colorant. They may further comprise at least one photoinitiator that initiates polymerization of the curable monomer. Exemplary phase change inks suitable for use include those described in U.S. Pat. Nos. 7,276,614 and 7,279,587 and U.S. Patent Publication Nos. 2007/0120908; 2007/0120909; and 2007/0120925, the entire disclosures of which are hereby fully incorporated herein by reference. The printing processes of the present disclosure take advantage of this rapid change in the viscosity to limit lateral ink spreading along the surface of the flexible packaging material prior to curing.

The curing of the curable monomer may be radically or cationically initiated. In embodiments, the monomer is equipped with one or more curable moieties, including, but not limited to, acrylates; methacrylates; vinyl ethers; epoxides, such as cycloaliphatic epoxides, aliphatic epoxides, and glycidyl epoxides; oxetanes; and the like. Suitable radiation, such as UV, curable monomers include, but are not limited to, acrylated esters, acrylated polyesters, acrylated ethers, acrylated polyethers, acrylated epoxies, urethane acrylates, and pentaerythritol tetraacrylate. Specific examples of suitable acrylated monomers include monoacrylates, diacrylates, and polyfunctional alkoxylated or polyalkoxylated acrylic monomers comprising one or more di- or tri-acrylates. Suitable monoacrylates are, for example, cyclohexyl acrylate, 2-ethoxy ethyl acrylate, 2-methoxy ethyl acrylate, 2-(2-ethoxyethoxy) ethyl acrylate, stearyl acrylate, tetrahydrofurfuryl acrylate, octyl acrylate, lauryl acrylate, behenyl acrylate, 2-phenoxy ethyl acrylate, tertiary butyl acrylate, glycidyl acrylate, isodecyl acrylate, benzyl acrylate, hexyl acrylate, isooctyl acrylate, isobornyl acrylate, butanediol monoacrylate, ethoxylated phenol monoacrylate, oxyethylated phenol acrylate, monomethoxy hexanediol acrylate, beta-carboxy ethyl acrylate, dicyclopentyl acrylate, carbonyl acrylate, octyl decyl acrylate, ethoxylated nonylphenol acrylate, hydroxyethyl acrylate, hydroxyethyl methacrylate, and the like. Suitable polyfunctional acrylates are, for example: neopentyl glycol diacrylates, butanediol diacrylates, trimethylolpropane triacrylates, glyceryl triacrylates, 1,3-butylene glycol diacrylate, 1,4-butanediol diacrylate, diethylene glycol diacrylate, 1,6-hexanediol diacrylate, tetraethylene glycol diacrylate, triethylene glycol diacrylate, tripropylene glycol diacrylate, polybutanediol diacrylate, polyethylene glycol diacrylate, polybutadiene diacrylate, tris (2-hydroxy ethyl) isocyanurate triacrylate, dipentaerythritol pentaacrylate, pentaerythritol tetraacrylate, and the like. Advantageous properties, especially reduced skin irritancy, can be obtained when monomers are alkoxylated, such as ethoxylated or propoxylated, for example: propoxylated neopentyl glycol diacrylate, ethoxylated neopentyl glycol diacrylate, propoxylated hexanediol diacrylate. In embodiments, one suitable monomer is a propoxylated neopentyl glycol diacrylate, such as, for example, SR-9003 (Sartomer Co., Inc., Exton, Pa.). Other suitable reactive monomers are likewise commercially available from, for example, Sartomer Co., Inc., Cytec Industries, Rahn AG, and the like.

The curable monomer in embodiments is included in the ink in an amount of, for example, about 20 to about 90% by weight of the ink, such as about 30 to about 85% by weight of the ink, or about 40 to about 80% by weight of the ink.

The phase change agent may generally be any component that is miscible with the other components of the phase change ink and promotes the increase in viscosity of the ink as it cools from the jetting temperature to the substrate temperature. Examples of classes of phase change agents include gellants, solid alcohols, and waxes.

In specific embodiments, a gellant is used as the phase change agent. The organic gellant functions to dramatically increase the viscosity of the ink within a desired temperature range. In particular, the gellant forms a semi-solid gel in the ink vehicle at temperatures below the specific temperature at which the ink is jetted. The semi-solid gel phase is a physical gel that exists as a dynamic equilibrium comprised of one or more solid gellant molecules and a liquid solvent. The semi-solid gel phase is a dynamic networked assembly of molecular components held together by non-covalent interactions such as hydrogen bonding, Van der Waals interactions, aromatic non-bonding interactions, ionic or coordination bonding, London dispersion forces, and the like, which upon stimulation by physical forces such as temperature and mechanical agitation or chemical forces such as pH or ionic strength, can reversibly transition from liquid to semi-solid state at the macroscopic level. The inks exhibit a thermally reversible transition between the semi-solid gel state and the liquid state when the temperature is varied above or below the gel point of the ink. This reversible cycle of transitioning between semi-solid gel phase and liquid phase can be repeated many times in the ink formulation.

Any suitable gellant can be used for the ink vehicles disclosed herein. Specifically, the gellant can be selected from materials disclosed in U.S. Pat. No. 7,279,587, entitled "Photoinitiator With Phase Change Properties and Gellant Affinity," with the named inventors Peter G. Odell, Eniko Toma, and Jennifer L. Belelie and U.S. Pat. No. 7,276,614, entitled "Curable Amide Gellant Compounds," with the named inventors Eniko Toma, Peter G. Odell, Adela Goredema and Jennifer L. Belelie, the disclosures of which are totally incorporated herein by reference, such as a compound of the formula

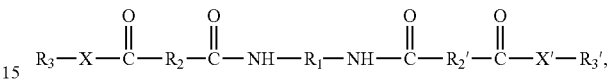

wherein:

$R_1$ is:

(i) an alkylene group (wherein an alkylene group is defined as a divalent aliphatic group or alkyl group, including linear and branched, saturated and unsaturated, cyclic and acyclic, and substituted and unsubstituted alkylene groups, and wherein heteroatoms, such as oxygen, nitrogen, sulfur, silicon, phosphorus, boron, and the like either may or may not be present in the alkylene group), in one embodiment with at least 1 carbon atom, and in one embodiment with no more than about 12 carbon atoms, in another embodiment with no more than about 4 carbon atoms, and in yet another embodiment with no more than about 2 carbon atoms, although the number of carbon atoms can be outside of these ranges, (ii) an arylene group (wherein an arylene group is defined as a divalent aromatic group or aryl group, including substituted and unsubstituted arylene groups, and wherein heteroatoms, such as oxygen, nitrogen, sulfur, silicon, phosphorus, boron, and the like either may or may not be present in the arylene group), in one embodiment with at least about 5 carbon atoms, and in another embodiment with at least about 6 carbon atoms, and in one embodiment with no more than about 14 carbon atoms, in another embodiment with no more than about 10 carbon atoms, and in yet another embodiment with no more than about 6 carbon atoms, although the number of carbon atoms can be outside of these ranges, (iii) an arylalkylene group (wherein an arylalkylene group is defined as a divalent arylalkyl group, including substituted and unsubstituted arylalkylene groups, wherein the alkyl portion of the arylalkylene group can be linear or branched, saturated or unsaturated, and cyclic or acyclic, and wherein heteroatoms, such as oxygen, nitrogen, sulfur, silicon, phosphorus, boron, and the like either may or may not be present in either the aryl or the alkyl portion of the arylalkylene group), in one embodiment with at least about 6 carbon atoms, and in another embodiment with at least about 7 carbon atoms, and in one embodiment with no more than about 32 carbon atoms, in another embodiment with no more than about 22 carbon atoms, and in yet another embodiment with no more than about 7 carbon atoms, although the number of carbon atoms can be outside of these ranges, or (iv) an alkylarylene group (wherein an alkylarylene group is defined as a divalent alkylaryl group, including substituted and unsubstituted alkylarylene groups, wherein the alkyl portion of the alkylarylene group can be linear or branched, saturated or unsaturated, and cyclic or acyclic, and wherein heteroatoms, such as oxygen, nitrogen, sulfur, silicon, phosphorus, boron, and the like either may or may not be present in either the aryl or the alkyl portion of the alkylarylene group), in one embodiment with at least about 6 carbon atoms, and in another embodiment with at least about 7 carbon atoms, and in one embodiment with no more than about 32 carbon atoms, in another embodiment with no more than about 22 carbon atoms, and in yet another embodiment with no more than about 7 carbon atoms, although the number of carbon atoms can be outside of these ranges, wherein the substituents on the substituted alkylene, arylene, arylalkylene, and alkylarylene groups can be (but are not limited to) halogen atoms, cyano groups, pyridine groups, pyridinium groups, ether groups, aldehyde groups, ketone groups, ester groups, amide groups, carbonyl groups, thiocarbonyl groups, sulfide groups, nitro groups, nitroso groups, acyl groups, azo groups, urethane groups, urea groups, mixtures thereof, and the like, wherein two or more substituents can be joined together to form a ring;

$R_2$ and $R_2'$ each, independently of the other, are selected from the group consisting of:

(i) alkylene groups (wherein an alkylene group is defined as a divalent aliphatic group or alkyl group, including linear and branched, saturated and unsaturated, cyclic and acyclic, and substituted and unsubstituted alkylene groups, and wherein heteroatoms, such as oxygen, nitrogen, sulfur, silicon, phosphorus, boron, and the like either may or may not be present in the alkylene group), in one embodiment with at least 1 carbon atom, and in one embodiment with no more than about 54 carbon atoms, and in another embodiment with no more than about 36 carbon atoms, although the number of carbon atoms can be outside of these ranges, (ii) arylene groups (wherein an arylene group is defined as a divalent aromatic group or aryl group, including substituted and unsubstituted arylene groups, and wherein heteroatoms, such as oxygen, nitrogen, sulfur, silicon, phosphorus, boron, and the like either may or may not be present in the arylene group), in one embodiment with at least about 5 carbon atoms, and in another embodiment with at least about 6 carbon atoms, and in one embodiment with no more than about 14 carbon atoms, in another embodiment with no more than about 10 carbon atoms, and in yet another embodiment with no more than about 7 carbon atoms, although the number of carbon atoms can be outside of these ranges, (iii) arylalkylene groups (wherein an arylalkylene group is defined as a divalent arylalkyl group, including substituted and unsubstituted arylalkylene groups, wherein the alkyl portion of the arylalkylene group can be linear or branched, saturated or unsaturated, and cyclic or acyclic, and wherein heteroatoms, such as oxygen, nitrogen, sulfur, silicon, phosphorus, boron, and the like either may or may not be present in either the aryl or the alkyl portion of the arylalkylene group), in one embodiment with at least about 6 carbon atoms, and in another embodiment with at least about 7 carbon atoms, and in one embodiment with no more than about 32 carbon atoms, in another embodiment with no more than about 22 carbon atoms, and in yet another embodiment with no more than about 8 carbon atoms, although the number of carbon atoms can be outside of these ranges, or (iv) alkylarylene groups (wherein an alkylarylene group is defined as a divalent alkylaryl group, including substituted and unsubstituted alkylarylene groups, wherein the alkyl portion of the alkylarylene group can be linear or branched, saturated or unsaturated, and cyclic or acyclic, and wherein heteroatoms, such as oxygen, nitrogen, sulfur, silicon, phosphorus, boron, and the like either may or may not be present in either the aryl or the alkyl portion of the alkylarylene group), in one embodiment with at least about 6 carbon atoms, and in another embodiment with at least about 7 carbon atoms, and in one embodiment with no more than about 32 carbon atoms, in another embodiment with no more than about 22 carbon atoms, and in yet another embodiment with no more than about 7 carbon atoms, although the number of carbon atoms can be outside of these ranges, wherein the substituents on the substituted alkylene, arylene, arylalkylene, and alkylarylene groups can be (but are not limited to) halogen atoms, cyano groups, ether groups, aldehyde groups, ketone groups, ester groups, amide groups, carbonyl groups, thiocarbonyl groups, phosphine groups, phosphonium groups, phosphate groups, nitrile groups, mercapto groups, nitro groups, nitroso groups, acyl groups, acid anhydride groups, azide groups, azo groups, cyanato groups, urethane groups, urea groups, mixtures thereof, and the like, wherein two or more substituents can be joined together to form a ring;

$R_3$ and $R_3'$ each, independently of the other, are either:

(i) photoinitiating groups, such as groups derived from 1-(4-(2-hydroxyethoxy)phenyl)-2-hydroxy-2-methylpropan-1-one, of the formula

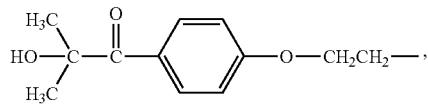

groups derived from 1-hydroxycyclohexylphenylketone, of the formula

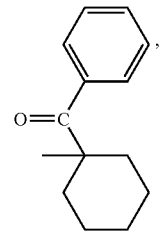

groups derived from 2-hydroxy-2-methyl-1-phenylpropan-1-one, of the formula

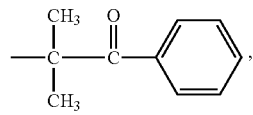

or the like, or:

(ii) a group which is:

(a) an alkyl group (including linear and branched, saturated and unsaturated, cyclic and acyclic, and substituted and unsubstituted alkyl groups, and wherein heteroatoms, such as oxygen, nitrogen, sulfur, silicon, phosphorus, boron, and the like either may or may not be present in the alkyl group), in one embodiment with at least about 2 carbon atoms, in another embodiment with at least about 3 carbon atoms, and in yet another embodiment with at least about 4 carbon atoms, and in one embodiment with no more than about 100 carbon atoms, in another embodiment with no more than about 60 carbon atoms, and in yet another embodiment with no more than about 30 carbon atoms, although the number of carbon atoms can be outside of these ranges, (b) an aryl group (including substituted and unsubstituted aryl groups, and wherein heteroatoms, such as oxygen, nitrogen, sulfur, silicon, phosphorus, boron, and the like either may or may not be present in the aryl group), in one embodiment with at least about 5 carbon atoms, and in another embodiment with at least about 6 carbon atoms, and in one embodiment with no more than about 100 carbon atoms, in another embodiment with no more than about 60 carbon atoms, and in yet another embodiment with no more than about 30 carbon atoms, although the number of carbon atoms can be outside of these ranges, such as phenyl or the like, (c) an arylalkyl group (including substituted and unsubstituted arylalkyl groups, wherein the alkyl portion of the arylalkyl group can be linear or branched, saturated or unsaturated, and cyclic or acyclic, and wherein heteroatoms, such as oxygen, nitrogen, sulfur, silicon, phosphorus, boron, and the like either may or may not be present in either the aryl or the alkyl portion of the arylalkyl group), in one embodiment with at least about 6 carbon atoms, and in another embodiment with at least about 7 carbon atoms, and in one embodiment with no more than about 100 carbon atoms, in another embodiment with no more than about 60 carbon atoms, and in yet another embodiment with no more than about 30 carbon atoms, although the number of carbon atoms can be outside of these ranges, such as benzyl or the like, or (d) an alkylaryl group (including substituted and unsubstituted alkylaryl groups, wherein the alkyl portion of the alkylaryl group can be linear or branched, saturated or unsaturated, and cyclic or acyclic, and wherein heteroatoms, such as oxygen, nitrogen, sulfur, silicon, phosphorus, boron, and the like either may or may not be present in either the aryl or the alkyl portion of the alkylaryl group), in one embodiment with at least about 6 carbon atoms, and in another embodiment with at least about 7 carbon atoms, and in one embodiment with no more than about 100 carbon atoms, in another embodiment with no more than about 60 carbon atoms, and in yet another embodiment with no more than about 30 carbon atoms, although the number of carbon atoms can be outside of these ranges, such as tolyl or the like, wherein the substituents on the substituted alkyl, arylalkyl, and alkylaryl groups can be (but are not limited to) halogen atoms, ether groups, aldehyde groups, ketone groups, ester groups, amide groups, carbonyl groups, thiocarbonyl groups, sulfate groups, sulfonate groups, sulfonic acid groups, sulfide groups, sulfoxide groups, phosphine groups, phosphonium groups, phosphate groups, nitrile groups, mercapto groups, nitro groups, nitroso groups, sulfone groups, acyl groups, acid anhydride groups, azide groups, azo groups, cyanato groups, isocyanato groups, thiocyanato groups, isothiocyanato groups, carboxylate groups, carboxylic acid groups, urethane groups, urea groups, mixtures thereof, and the like, wherein two or more substituents can be joined together to form a ring;

X and X' each, independently of the other, is an oxygen atom or a group of the formula —NR$_4$—, wherein R$_4$ is:

(i) a hydrogen atom;

(ii) an alkyl group, including linear and branched, saturated and unsaturated, cyclic and acyclic, and substituted and unsubstituted alkyl groups, and wherein heteroatoms either may or may not be present in the alkyl group, in one embodiment with at least 1 carbon atom, and in one embodiment with no more than about 100 carbon atoms, in another embodiment with no more than about 60 carbon atoms, and in yet another embodiment with no more than about 30 carbon atoms, although the number of carbon atoms can be outside of these ranges, (iii) an aryl group, including substituted and unsubstituted aryl groups, and wherein heteroatoms either may or may not be present in the aryl group, in one embodiment with at least about 5 carbon atoms, and in another embodiment with at least about 6 carbon atoms, and in one embodiment with no more than about 100 carbon atoms, in another embodiment with no more than about 60 carbon atoms, and in yet another embodiment with no more than about 30 carbon atoms, although the number of carbon atoms can be outside of these ranges, (iv) an arylalkyl group, including substituted and unsubstituted arylalkyl groups, wherein the alkyl portion of the arylalkyl group can be linear or branched, saturated or unsaturated, and cyclic or acyclic, and wherein heteroatoms either may or may not be present in either the aryl or the alkyl portion of the arylalkyl group, in one embodiment with at least about 6 carbon atoms, and in another embodiment with at least about 7 carbon atoms, and in one embodiment with no more than about 100 carbon atoms, in another embodiment with no more than about 60 carbon atoms, and in yet another embodiment with no more than about 30 carbon atoms, although the number of carbon atoms can be outside of these ranges, or (v) an alkylaryl group, including substituted and unsubstituted alkylaryl groups, wherein the alkyl portion of the alkylaryl group can be linear or branched, saturated or unsaturated, and cyclic or acyclic, and wherein heteroatoms either may or may not be present in either the aryl or the alkyl portion of the alkylaryl group, in one embodiment with at least about 6 carbon atoms, and in another embodiment with at least about 7 carbon atoms, and in one embodiment with no more than about 100 carbon atoms, in another embodiment with no more than about 60 carbon atoms, and in yet another embodiment with no more than about 30 carbon atoms, although the number of carbon atoms can be outside of these ranges, wherein the substituents on the substituted alkyl, aryl, arylalkyl, and alkylaryl groups can be (but are not limited to) halogen atoms, ether groups, aldehyde groups, ketone groups, ester groups, amide groups, carbonyl groups, thiocarbonyl groups, sulfate groups, sulfonate groups, sulfonic acid groups, sulfide groups, sulfoxide groups, phosphine groups, phosphonium groups, phosphate groups, nitrile groups, mercapto groups, nitro groups, nitroso groups, sulfone groups, acyl groups, acid anhydride groups, azide groups, azo groups, cyanato groups, isocyanato groups, thiocyanato groups, isothiocyanato groups, carboxylate groups, carboxylic acid groups, urethane groups, urea groups, mixtures thereof, and the like, wherein two or more substituents can be joined together to form a ring.

In specific embodiments, the gellant is a compound of one of the following formulas:
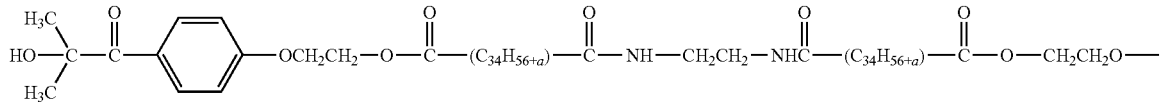
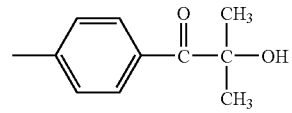
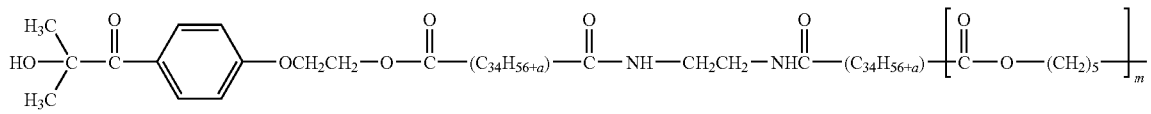
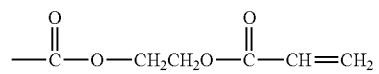
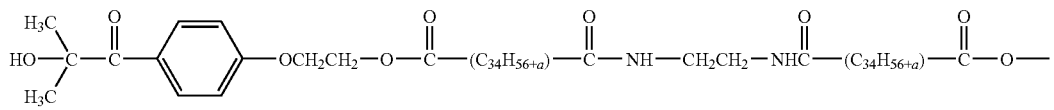
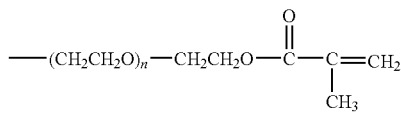
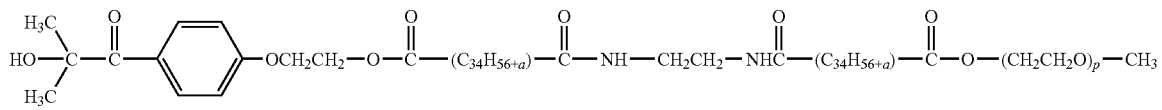
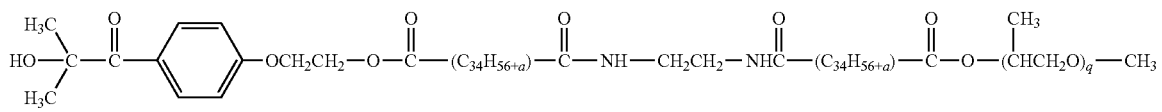
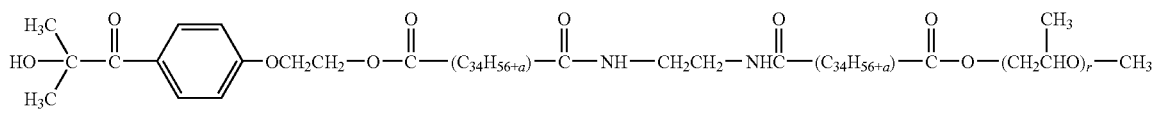
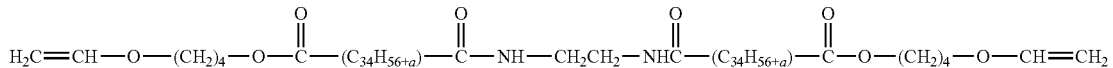
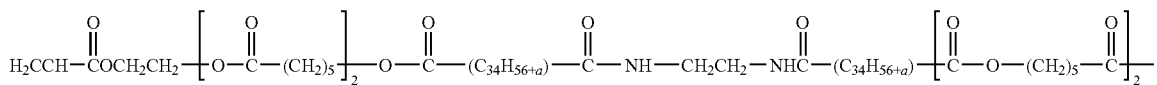
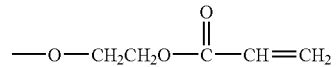

wherein —$C_{34}H_{56+a}$— represents a branched alkylene group which may include unsaturated groups and cyclic groups, wherein a is an integer from 0 to 12, and wherein m, n, p, q, and r are each independently an integer from 2 to 5. In particular embodiments, the —$C_{34}H_{56+a}$— moiety has the structure of:

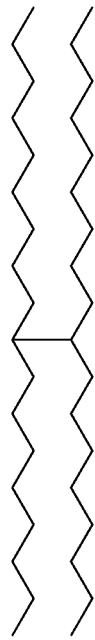

or an isomer thereof.

The gellant compounds as disclosed herein can be prepared by any desired or effective method. For example, in one specific embodiment, about two molar equivalents of a diacid of the formula HOOC—$R_2$—COOH, about one molar equivalent of a diamine of the formula $H_2N$—$R_1$—$NH_2$, and about two molar equivalents of a monoalcohol of the formula $R_3$—OH can be reacted by use of the coupling agent such as 1,3-dicyclohexylcarbodiimide (DCC) in the presence of a catalyst such as 4-dimethylaminopyridine (DMAP), in the presence of an optional solvent such as methylene chloride ($CH_2Cl_2$). The ingredients can be mixed together and a one-pot reaction can be employed. More specifically, the diacid, the diamine, and the coupling agent can be mixed together in a first step, and the monoalcohol can be added to the reaction mixture in a second step.

The diacid and the diamine are present in any desired or effective relative amounts, for example in one embodiment at least about 0.4 mole of diamine per every 1 mole of diacid, in another embodiment at least about 0.45 mole of diamine per every 1 mole of diacid, and in yet another embodiment at least about 0.5 mole of diamine per every one mole of diacid, and in one embodiment no more than about 0.57 mole of diamine per every 1 mole of diacid, in another embodiment no more than about 0.53 mole of diamine per every 1 mole of diacid, and in yet another embodiment no more than about 0.51 mole of diamine per every 1 mole of diacid.

The diacid and the monoalcohol are present in any desired or effective relative amounts, in one embodiment at least about 0.75 mole of monoalcohol per every 1 mole of diacid, in another embodiment at least about 0.9 mole of monoalcohol per every 1 mole of diacid, and in yet another embodiment at least about 1 mole of monoalcohol per every one mole of diacid, and in one embodiment no more than about 1.5 moles of monoalcohol per every 1 mole of diacid, in another embodiment no more than about 1.4 moles of monoalcohol per every 1 mole of diacid, and in yet another embodiment no more than about 1.25 moles of monoalcohol per every 1 mole of diacid.

The diamine and the monoalcohol are present in any desired or effective relative amounts, for example in one embodiment at least about 1.5 moles of monoalcohol per every 1 mole of diamine, in another embodiment at least about 1.75 moles of monoalcohol per every 1 mole of diamine, and in yet another embodiment at least about 2 moles of monoalcohol per every one mole of diamine, and in one embodiment no more than about 2.5 moles of monoalcohol per every 1 mole of diamine, in another embodiment no more than about 2.4 moles of monoalcohol per every 1 mole of diamine, and in yet another embodiment no more than about 2.25 moles of monoalcohol per every 1 mole of diamine.

Other exemplary coupling agents include 1,3-dicyclohexylcarbodiimide (DCC), 1-[3-(dimethylamino)propyl] 3-ethylcarbodiimide HCl (EDCl), N,N-carbonyldiimidazole, N-cyclohexyl-N'-(2-morpholinoethyl)-carbodiimide methyl-p-toluenesulfonate, (benzotriazol-1-yloxy)tris (dimethylamino)phosphonium hexafluorophosphate (BOP), (o-benzotriazol-1-yl)-N,N,N',N'-bis(tetramethlylene)uronium hexafluorophosphate (HBTU), bis(2-oxo-3-oxazolidinyl)phosphonic chloride (BOP-Cl), (1H-1,2,3-benzotriazol-1-yloxy)tris(pyrrolidino)phosphonium hexafluorophosphate (PyBOP), and the like, as well as mixtures thereof.

Other exemplary catalysts include 4-dimethylaminopyridine (DMAP), triethylamine, 1,8-diazabicyclo[5.4.0]undec-7-ene (DBU), and the like, as well as mixtures thereof.

Other exemplary solvents include methylene chloride, tetrahydrofuran, methyl ethyl ketone, toluene, dimethyl formamide, diethyl ether, hexane, ethyl acetate, and the like, as well as mixtures thereof.

The coupling agent and the diacid are present in any desired or effective relative amounts, for example in one embodiment at least about 0.4 mole of diacid per every 1 mole of coupling agent, in another embodiment at least about 0.45 mole of diacid per every 1 mole of coupling agent, and in yet another embodiment at least about 0.5 mole of diacid per every one mole of coupling agent, and in one embodiment no more than about 0.57 mole of diacid per every 1 mole of coupling agent, in another embodiment no more than about 0.53 mole of diacid per every 1 mole of coupling agent, and in yet another embodiment no more than about 0.51 mole of diacid per every 1 mole of coupling agent.

The catalyst and the diacid are present in any desired or effective relative amounts, for example in one embodiment at least about 0.05 mole of catalyst per every 1 mole of diacid, in another embodiment at least about 0.1 mole of catalyst per every 1 mole of diacid, and in yet another embodiment at least about 0.2 mole of catalyst per every one mole of diacid, and in one embodiment no more than about 1 mole of catalyst per every 1 mole of diacid, in another embodiment no more than about 0.8 mole of catalyst per every 1 mole of diacid, and in yet another embodiment no more than about 0.5 mole of catalyst per every 1 mole of diacid.

When the optional solvent is employed, the solvent can be present in any desired or effective amount, for example in one embodiment at least about 30 grams of diacid per liter of solvent, in another embodiment at least about 40 grams of diacid per liter of solvent, and in yet another embodiment at least about 50 grams of diacid per liter of solvent, and in one embodiment no more than about 150 grams of diacid per liter of solvent, in another embodiment no more than about 125 grams of diacid per liter of solvent, and in yet another embodiment no more than about 1100 grams of diacid per liter of solvent.

The reaction between the diacid and the diamine in the first step of the reaction can be carried out at any desired or effective temperature, for example in one embodiment at least about −5° C., in another embodiment at least about −2.5° C., and in yet another embodiment at least about 0° C., and one embodiment no more than about 2° C., in another embodiment no more than about 10° C., and in yet another embodiment no more than about 5° C. Thereafter, the reaction product of the diacid and diamine can be reacted with the monoalcohol at any desired or effective temperature, for example in one embodiment at least about 15° C., in another embodiment at least about 20° C., and in yet another embodiment at least about 25° C., and one embodiment no more than about 45° C., in another embodiment no more than about 35° C., and in yet another embodiment no more than about 30° C.

The reaction between the diacid, the diamine, and the monoalcohol can be carried out for any desired or effective period of time, for example in one embodiment from about 1 hour to about 11 hours, in another embodiment from about 2 hours to about 7 hours, and in yet another embodiment from about 4 hours to about 5 hours.

Subsequent to completion of the reaction, the product can be isolated by filtration of any solid by-products, or by washing the solution with water depending on the activating agent used. The solvent can be removed by rotary evaporation. If needed, the product can be purified by washing with acetone and drying.

The gellant compounds as disclosed herein can also be prepared by first reacting about two molar equivalents of a diacid of the formula HOOC—$R_2$—COOH and about one molar equivalent of a diamine of the formula $H_2N$—$R_1$—$NH_2$ under neat conditions (that is, in the absence of a solvent) at elevated temperatures while removing water from the reaction mixture to form an acid-terminated oligoamide. Thereafter, the acid-terminated oligoamide thus formed can be reacted with about 2 molar equivalents of a monoalcohol of the formula $R_3$—OH by use of a coupling agent such as 1,3-dicyclohexylcarbodiimide (DCC) in the presence of a catalyst such as 4-dimethylaminopyridine (DMAP) in the presence of a solvent such as methylene chloride ($CH_2Cl_2$) at reduced temperatures.

The diacid and the diamine are present in any desired or effective relative amounts, for example in one embodiment at least about 0.75 mole of diamine per every 2 moles of diacid, in another embodiment at least about 0.85 mole of diamine per every 2 moles of diacid, and in yet another embodiment at least about 1 mole of diamine per every 2 moles of diacid, and in one embodiment no more than about 1.5 moles of diamine per every 2 moles of diacid, in another embodiment no more than about 1.35 moles of diamine per every 2 moles of diacid, and in yet another embodiment no more than about 1.25 moles of diamine per every 2 moles of diacid.

Water can be removed from the reaction mixture between the diacid and the diamine by any desired or effective method, such as by a Dean-Stark trap, molecular sieves or other drying agents, or the like.

The reaction between the diacid and the diamine generally is run neat, although a solvent can be used if desired.

The reaction between the diacid and the diamine can be carried out at any desired or effective temperature, for example in one embodiment from about 130° C. to about 180° C., in another embodiment from about 140° C. to about 175° C., and in yet another embodiment from about 155° C. to about 165° C.

The reaction between the diacid and the diamine can be carried out for any desired or effective period of time, for example in one embodiment from about 1 hour to about 7 hours, in another embodiment from about 2 hours to about 5 hours, and in yet another embodiment from about 3 hours to about 4 hours.

Thereafter, the acid-terminated oligoamide intermediate and the monoalcohol are reacted in the presence of a coupling agent, a catalyst, and a solvent.

The acid-terminated oligoamide intermediate and the monoalcohol are present in any desired or effective relative amounts, for example in one embodiment at least about 2 moles of monoalcohol per every 1 mole of acid-terminated oligoamide intermediate, in another embodiment at least about 2.15 moles of monoalcohol per every 1 mole of acid-terminated oligoamide intermediate, and in yet another embodiment at least about 2.25 moles of monoalcohol per every one mole of acid-terminated oligoamide intermediate, and in one embodiment no more than about 3 moles of monoalcohol per every 1 mole of acid-terminated oligoamide intermediate, in another embodiment no more than about 2.5 moles of monoalcohol per every 1 mole of acid-terminated oligoamide intermediate, and in yet another embodiment no more than about 2,4 moles of monoalcohol per every 1 mole of acid-terminated oligoamide intermediate.

The acid-terminated oligoamide and the coupling agent are present in any desired or effective relative amounts, for example in one embodiment at least about 1.8 moles of coupling agent per every 1 mole of diacid diamide, in another embodiment at least about 2 moles of coupling agent per every 1 mole of diacid diamide, and in yet another embodiment at least about 2.2 moles of coupling agent per every one mole of diacid diamide, and in one embodiment no more than about 3 moles of coupling agent per every 1 mole of diacid diamide, in another embodiment no more that about 2.8 moles of coupling agent per every 1 mole of diacid diamide, and in yet another embodiment no more than about 2.5 moles of coupling agent per every 1 mole of diacid diamide.

The catalyst and the acid-terminated oligoamide intermediate are present in any desired or effective relative amounts, for example in one embodiment at least about 0.05 mole of catalyst per every 1 mole of acid-terminated oligoamide intermediate, in another embodiment at least about 0.1 moles of catalyst per every 1 mole of acid-terminated oligoamide intermediate, and in yet another embodiment at least about 0.2 mole of catalyst per every one mole of acid-terminated oligoamide intermediate, and in one embodiment no more than about 1 mole of catalyst per every 1 mole of acid-terminated oligoamide intermediate, in another embodiment no more than about 0.8 mole of catalyst per every 1 mole of acid-terminated oligoamide intermediate, and in yet another embodiment no more than about 0.5 mole of catalyst per every 1 mole of acid-terminated oligoamide intermediate.

The solvent can be present in any desired or effective amount, for example in one embodiment from about 20 milliliters of solvent per gram of acid-terminated oligoamide intermediate to about 100 milliliters of solvent per gram of acid-terminated oligoamide intermediate, in another embodiment from about 20 milliliters of solvent per gram of acid-terminated oligoamide intermediate to about 90 milliliters of solvent per gram of acid-terminated oligoamide intermediate, and in yet another embodiment from about 30 milliliters of solvent per gram of acid-terminated oligoamide intermediate to about 80 milliliters of solvent per gram of acid-terminated oligoamide intermediate.

The reaction between the acid-terminated oligoamide intermediate, the monoalcohol, and the coupling agent can be carried out at any desired or effective temperature, for example in one embodiment from about 10° C. to about 60° C., in another embodiment from about 15° C. to 40° C., in yet another embodiment from about 20° C. to 35° C.

The reaction between the acid-terminated oligoamide intermediate, the monoalcohol, and the coupling agent can be carried out for any desired or effective period of time, for example in one embodiment from about 1 hour to about 7 hours, in another embodiment from about 2 hours to about 7 hours, and in yet another embodiment from about 2 hours to about 5 hours, and in one embodiment no more than about 3 hours, and in another embodiment no more than about 4 hours.

Subsequent to completion of the reaction, the product can be recovered by any desired or effective method, such as filtration of any solid by-products or washing the solution with water depending on the coupling agent used. The solvent can be removed by rotary evaporation. If needed, the product can be purified by washing with acetone and dried in a vacuum oven.

Analogous procedures can be employed using amine compounds of the formula $HNR_3R_4$ in place of monoalcohols of the formula $R_3OH$.

Many embodiments of the compounds thus prepared can exhibit gel-like behavior in that they undergo a relatively sharp increase in viscosity over a relatively narrow temperature range when dissolved in a liquid carrier such as those compounds that behave as curable monomers when exposed to radiation such as actinic radiation or ultraviolet light. One example of such a liquid carrier is a propoxylated neopentyl glycol diacrylate such as SR9003, commercially available from Sartomer Co. Inc. In embodiments, some compounds as disclosed herein undergo a change in viscosity of, for example, at least about $10^3$ centipoise, in further embodiments at least about $10^5$ centipoise, and in yet further embodiments at least about $10^6$ centipoise over a temperature range of, for example, in one embodiment at least about 30° C., in another embodiment at least about 10° C., and in yet another embodiment at least about 5° C., and compounds that do not undergo changes within these ranges are also included herein.

The curable inks disclosed herein may form a semi-solid gel at a first temperature. For example, when the gellant is incorporated into a phase change ink, this temperature is below the specific temperature at which the ink is jetted. The semi-solid gel phase is a physical gel that exists as a dynamic equilibrium comprising one or more solid gellant molecules and a liquid solvent. The semi-solid gel phase is a dynamic networked assembly of molecular components held together by non-covalent interactions such as hydrogen bonding, Van der Waals interactions, aromatic non-bonding interactions, ionic or coordination bonding, London dispersion forces, or the like, which, upon stimulation by physical forces, such as temperature, mechanical agitation, or the like, or chemical forces, such as pH, ionic strength, or the like, can undergo reversible transitions from liquid to semi-solid state at the macroscopic level. The solutions containing the gellant molecules exhibit a thermally reversible transition between the semi-solid gel state and the liquid state when the temperature is varied above or below the gel point of the solution. This reversible cycle of transitioning between semi-solid gel phase and liquid phase can be repeated many times in the solution formulation.

The ink compositions can include the gellant in any suitable amount, such as about 1% to about 50% by weight of the ink. In embodiments, the gellant can be present in an amount of about 2% to about 20% by weight of the ink, such as about 5% to about 15% by weight of the ink, although the value can also be outside of this range.

The gellant compositions disclosed herein can, in at least some embodiments, act as an organic gellant in the ink to the viscosity of the ink within a desired temperature range. In particular, the gellant can in some embodiments form a semi-solid gel in the ink vehicle at temperatures below the specific temperature at which the ink is jetted.

Optionally, a curable wax may be added to the ink formulation. The curable wax may be any wax component that is miscible with the other components and that will polymerize with the curable monomer to form a polymer. The term "wax" includes, for example, any of the various natural, modified natural, and synthetic materials commonly referred to as waxes. A wax is solid at room temperature, specifically at 25° C. Inclusion of the wax promotes an increase in viscosity of the ink as it cools from the jetting temperature.

Suitable examples of curable waxes include, but are not limited to, those waxes that include or are functionalized with curable groups. The curable groups may include, for example, acrylate, methacrylate, alkene, allylic ether, epoxide, oxetane, and the like. These waxes can be synthesized by the reaction of a wax equipped with a transformable functional group, such as carboxylic acid or hydroxyl.

Suitable examples of hydroxyl-terminated polyethylene waxes that may be functionalized with a curable group include, but are not limited to, mixtures of carbon chains with the structure $CH_3$—$(CH_2)_n$—$CH_2OH$, where there is a mixture of chain lengths, n, where the average chain length can be in the range of about 16 to about 50, and linear low molecular weight polyethylene, of similar average chain length. Suitable examples of such waxes include, but are not limited to, the UNILIN® series of materials such as UNILIN® 350, UNILIN® 425, UNILIN® 550 and UNILIN® 700 with Mn approximately equal to 375, 460, 550 and 700 g/mol, respectively. All of these waxes are commercially available from Baker-Petrolite. Guerbet alcohols, characterized as 2,2-dialkyl-1-ethanols, are also suitable compounds. Exemplary Guerbet alcohols include those containing about 16 to about 36 carbons, many of which are commercially available from Jarchem Industries Inc., Newark, N.J. PRIPOL® 2033 (C-36 dimer diol mixture including isomers of the formula

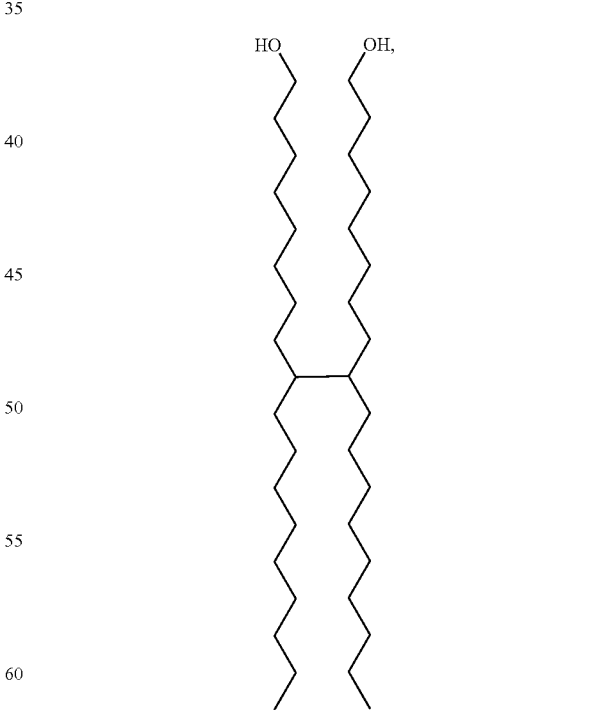

as well as other branched isomers that may include unsaturations and cyclic groups, available from Uniqema, New Castle, Del.; further information on $C_{36}$ dimer diols of this type is disclosed in, for example, "Dimer Acids," *Kirk-Othmer Ency-* clopedia of Chemical Technology, Vol. 8, 4th Ed. (1992), pp. 223 to 237, the disclosure of which is totally incorporated herein by reference, can also be used. These alcohols can be reacted with carboxylic acids equipped with UV curable moieties to form reactive esters. Examples of these acids include acrylic and methacrylic acids, available from Sigma-Aldrich Co. In embodiments, suitable curable monomers include waxy acrylates, such as acrylates of UNILIN® 350, UNILIN® 425, UNILIN® 550 and UNILIN® 700.

Suitable examples of carboxylic acid-terminated polyethylene waxes that may be functionalized with a curable group include mixtures of carbon chains with the structure $CH_3$—$(CH_2)_n$—COOH, where there is a mixture of chain lengths, n, where the average chain length is about 16 to about 50, and linear low molecular weight polyethylene, of similar average chain length. Suitable examples of such waxes include, but are not limited to, UNICID® 350, UNICID® 425, UNICID® 550 and UNICID® 700 with Mn equal to approximately 390, 475, 565 and 720 g/mol, respectively. Other suitable waxes have a structure $CH_3$—$(CH_2)_n$—COOH, such as hexadecanoic or palmitic acid with n=14, heptadecanoic or margaric or daturic acid with n=15, octadecanoic or stearic acid with n=16, eicosanoic or arachidic acid with n=18, docosanoic or behenic acid with n=20, tetracosanoic or lignoceric acid with n=22, hexacosanoic or cerotic acid with n=24, heptacosanoic or carboceric acid with n=25, octacosanoic or montanic acid with n=26, triacontanoic or melissic acid with n=28, dotriacontanoic or lacceroic acid with n=30, tritriacontanoic or ceromelissic or psyllic acid, with n=31, tetratriacontanoic or geddic acid with n=32, pentatriacontanoic or ceroplastic acid with n=33. Guerbet acids, characterized as 2,2-dialkyl ethanoic acids, are also suitable compounds. Exemplary Guerbet acids include those containing 16 to 36 carbons, many of which are commercially available from Jarchem Industries Inc., Newark, N.J. PRIPOL® 1009 (C-36 dimer acid mixture including isomers of the formula:

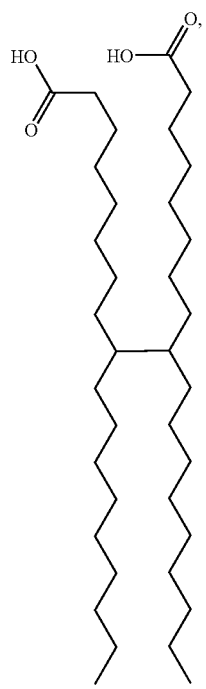

as well as other branched isomers that may include unsaturations and cyclic groups, available from Uniqema, New Castle, Del. Further information on $C_{36}$ dimer acids of this type is disclosed in, for example, "Dimer Acids," *Kirk-Othmer Encyclopedia of Chemical Technology*, Vol. 8, 4th Ed. (1992), pp. 223 to 237, the disclosure of which is totally incorporated herein by reference, can also be used. These carboxylic acids can be reacted with alcohols equipped with UV curable moieties to form reactive esters. Examples of these alcohols include, but are not limited to, 2-allyloxyethanol from Sigma-Aldrich Co.;

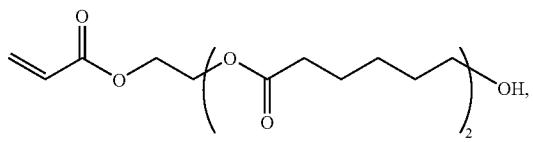

SR495B from Sartomer Company, Inc.;

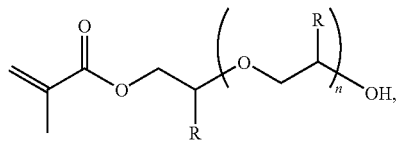

CD572 (R=H, n=10) and SR604 (R=Me, n=4) from Sartomer Company, Inc.

Other suitable examples of curable waxes include, for example, $AB_2$ diacrylate hydrocarbon compounds that may be prepared by reacting $AB_2$ molecules with acryloyl halides, and then further reacting with aliphatic long-chain, monofunctional aliphatic compounds. Suitable functional groups useful as A groups in embodiments include carboxylic acid groups and the like. Suitable functional groups useful as B groups in embodiments may be hydroxyl groups, thiol groups, amine groups, amide groups, imide groups, phenol groups, and mixtures thereof. Exemplary $AB_2$ molecules include, for example, bishydroxy alkyl carboxylic acids ($AB_2$ molecules in which A is carboxylic acid and B is hydroxyl), 2,2-bis(hydroxymethyl) butyric acid, N,N-bis(hydroxyethyl) glycine, 2,5-dihydroxybenzyl alcohol, 3,5-bis(4-aminophenoxy)benzoic acid, and the like. Exemplary $AB_2$ molecules also include those disclosed in Jikei et al. (Macromolecules, 33, 6228-6234 (2000)).

In embodiments, the acryloyl halide may be chosen from acryloyl fluoride, acryloyl chloride, acryloyl bromide, and acryloyl iodide, and mixtures thereof. In particular embodiments, the acryloyl halide is acryloyl chloride.

Exemplary methods for making $AB_2$ molecules may include optionally protecting the B groups first. Methods for protecting groups such as hydroxyls will be known to those of skill in the art. An exemplary method for making $AB_2$ molecules such as 2,2-bis(hydroxylmethyl)proprionic acid is the use of benzaldehyde dimethyl acetal catalyzed by a sulfonic acid such as p-toluene sulfonic acid in acetone at room temperature to form benzylidene-2,2-bis(oxymethyl)proprionic acid. This protected $AB_2$ molecule may be subsequently coupled with an aliphatic alcohol Suitable aliphatic alcohols include stearyl alcohol; 1-docosanol; hydroxyl-terminated polyethylene waxes such as mixtures of carbon chains with the stricture $CH_3$—$(CH_2)_n$—$CH_2OH$, where there is a mixture of chain lengths, n, having an average chain length, in some embodiments, in the range of about 12 to about 100; and linear low molecular weight polyethylenes that have an average chain length similar to that of the described hydroxyl-terminated polyethylene waxes. Suitable examples of such waxes include, but are not limited to, UNILIN 350, UNILIN 425, UNILIN 550 and UNILIN 700 with $M_n$ approximately equal to 375, 460, 550 and 700 g/mol, respectively. All of these waxes are commercially available from Baker-Petrolite. Guerbet alcohols, characterized as 2,2-dialkyl-1-ethanols, are also suitable compounds. In particular embodiments, the Guerbet alcohols may be chosen from Guerbet alcohols containing 16 to 36 carbon atoms; many such Guerbet alcohols are commercially available from Jarchem Industries Inc., Newark, N.J.

The acid group of the $AB_2$ monomer may be esterified by the aliphatic alcohol using p-toluenesulfonic acid in refluxing toluene. Following the reaction of the aliphatic alcohol with the protected $AB_2$ monomer, the protecting groups may be removed in methylene chloride using a palladium carbon catalyst under hydrogen gas. Once deprotected, the final product diacrylate aliphatic ester may be made using acryloyl chloride in methylene chloride with pyridine or triethylamine.

The curable wax can be included in the ink composition in an amount of from, for example, about 0 to about 25% by weight of the ink, such as about 1 or about 2 to about 10 or about 15% by weight of the ink. In an embodiment, the curable wax can be included in the ink composition in an amount of from about 3 to about 10% by weight of the ink, such as about 4 to about 6% by weight of the ink.

Any desired or effective colorant can be employed in the inks, including pigment, dye, mixtures of pigment and dye, mixtures of pigments, mixtures of dyes, and the like, provided that the colorant can be dissolved or dispersed in the ink vehicle. The compositions can be used in combination with conventional ink colorant materials, such as Color Index (C.I.) Solvent Dyes, Disperse Dyes, modified Acid and Direct Dyes, Basic Dyes, Sulphur Dyes, Vat Dyes, and the like.

Examples of suitable dyes include Usharect Blue 86 (Direct Blue 86), available from Ushanti Color; Intralite Turquoise 8GL (Direct Blue 86), available from Classic Dyestuffs; Chemictive Brilliant Red 7BH (Reactive Red 4), available from Chemiequip; Levafix Black EB, available from Bayer; Reactron Red H8B (Reactive Red 31), available from Atlas Dye-Chem; D&C Red #28 (Acid Red 92), available from Warner-Jenkinson; Direct Brilliant Pink B, available from Global Colors; Acid Tartrazine, available from Metrochem Industries; Cartasol Yellow 6GF Clariant; Carta Blue 2GL, available from Clariant; and the like. Particularly suitable are solvent dyes; within the class of solvent dyes, spirit soluble dyes are desired because of their compatibility with the ink vehicles of the present invention. Examples of suitable spirit solvent dyes include Neozapon Red 492 (BASF); Orasol Red G (Ciba); Direct Brilliant Pink B (Global Colors); Aizen Spilon Red C-BH (Hodogaya Chemical); Kayanol Red 3BL (Nippon Kayaku); Spirit Fast Yellow 3G; Aizen Spilon Yellow C-GNH (Hodogaya Chemical); Cartasol Brilliant Yellow 4GF (Clariant); Pergasol Yellow CGP (Ciba); Orasol Black RLP (Ciba); Savinyl Black RLS (Clariant); Morfast Black Conc. A (Rohm and Haas); Orasol Blue GN (Ciba); Savinyl Blue GLS (Sandoz); Luxol Fast Blue MBSN (Pylam); Sevron Blue 5GMF (Classic Dyestuffs); Basacid Blue 750 (BASF), and the like. Neozapon Black X51 [C.I. Solvent Black, C.I. 12195] (BASF), Sudan Blue 670 [C.I. 61554] (BASF), Sudan Yellow 146 [C.I. 12700] (BASF), and Sudan Red 462 [C.I. 260501] (BASF) are particularly suitable in embodiments.

Pigments are also suitable colorants for the inks. Examples of suitable pigments include Violet Paliogen Violet 5100 (BASF); Paliogen Violet 5890 (BASF); Heliogen Green L8730 (BASF); Lithol Scarlet D3700 (BASF); Sunfast® Blue 15:4 (Sun Chemical 249-0592); Hostaperm Blue B2G-D (Clariant); Permanent Red P-F7RK; Hostaperm Violet BL (Clariant); Lithol Scarlet 4440 (BASF); Bon Red C (Dominion Color Company); Oracet Pink RF (Ciba); Paliogen Red 3871 K (BASF); Sunfast® Blue 15:3 (Sun Chemical 249-1284); Paliogen Red 3340 (BASF); Sunfast® Carbazole Violet 23 (Sun Chemical 246-1670); Lithol Fast Scarlet L4300 (BASF); Sunbrite Yellow 17 (Sun Chemical 275-0023); Heliogen Blue L6900, L7020 (BASF); Sunbrite Yellow 74 (Sun Chemical 272-0558); Spectra Pac® C Orange 16 (Sun Chemical 276-3016); Heliogen Blue K6902, K6910 (BASF); Sunfast® Magenta 122 (Sun Chemical 228-0013); Heliogen Blue D6840, D7080 (BASF); Sudan Blue OS (BASF); Neopen Blue FF4012 (BASF); PV Fast Blue B2GO1 (Clariant); Irgalite Blue BCA (Ciba); Paliogen Blue 6470 (BASF); Sudan Orange G (Aldrich), Sudan Orange 220 (BASF); Paliogen Orange 3040 (BASF); Paliogen Yellow 152, 1560 (BASF); Lithol Fast Yellow 0991K (BASF); Paliotol Yellow 1840 (BASF); Novoperm Yellow FGL (Clariant); Lumogen Yellow D0790 (BASF); Suco-Yellow L1250 (BASF); Suco-Yellow D1355 (BASF); Suco Fast Yellow DI 355, DI 351 (BASF); Hostaperm Pink E 02 (Clariant); Hansa Brilliant Yellow 5GX03 (Clariant); Permanent Yellow GRL 02 (Clariant); Permanent Rubine L6B 05 (Clariant); Fanal Pink D4830 (BASF); Cinquasia Magenta (Du Pont), Paliogen Black L0084 (BASF); Pigment Black K801 (BASF); and carbon blacks such as REGAL 330™. (Cabot), Nipex 150 (Degussa) Carbon Black 5250, Carbon Black 5750 (Columbia Chemical), mixtures thereof and the like.

The colorant can be included in the ink in any suitable amount, such as an amount of from about 0.1 to about 15% by weight of the ink, such as about 0.5 or about 1 to about 8 or about 10% by weight of the ink.

In embodiments, the composition may further comprise an initiator, such as a photoinitiator, that initiates polymerization of curable components of the ink, including the curable monomer and the optional curable wax. The initiator should be soluble in the composition. In embodiments, the initiator is a UV-activated photoinitiator.

In embodiments, the initiator can be a radical initiator. Examples of radical photoinitiators include (but are not limited to) benzophenone derivatives, benzyl ketones, monomeric hydroxyl ketones, α-amino ketones, acyl phosphine oxides, metallocenes, benzoin ethers, benzil ketals, α-hydroxyalkylphenones, α-aminoalkylphenones, acylphosphine photoinitiators sold under the trade designations of IRGACURE® and DAROCUR® from Ciba, isopropyl thioxanthenones, and the like, and mixtures and combinations thereof. Specific examples include 1-hydroxy-cyclohexylphenylketone, benzophenone, benzophenone derivatives, 2-benzyl-2-(dimethylamino)-1-(4-(4-morphorlinyl)phenyl)-1-butanone, 2-methyl-1-(4-methylthio)phenyl-2-(4-morphorlinyl)-1-propanone, diphenyl-(2,4,6-trimethylbenzoyl) phosphine oxide, phenyl bis(2,4,6-trimethylbenzoyl) phosphine oxide, benzyl-dimethylketal, isopropylthioxanthone, 2,4,6-trimethylbenzoyidiphenylphosphine oxide (available as BASF LUCIRIN TPO®), 2,4,6-trimethylbenzoylethoxyphenylphosphine oxide (available as BASF LUCIRIN TPO-L®), bis(2,4,6-trimethylbenzoyl)-phenyl-phosphine oxide (available as Ciba IRGACURE® 819) and other acyl phosphines, 2-methyl-1-(4-(methylthio)phenyl-2-(4-morphorlinyl)-1-propanone (available as Ciba IRGACURE® 907) and 1-(4-(2-hydroxyethoxy)phenyl)-2-hydroxy-2-methylpropan-1-one (available as Ciba IRGACURE® 2959), 2-benzyl 2-dimethylamino 1-(4-morpholinophenyl) butanone-1 (available as Ciba IRGACURE® 369), 2-hydroxy-1-(4-(4-(2-hydroxy-2-methylpropionyl)-benzyl)-phenyl)-2-methylpropan-1-one (available as Ciba IRGACURE® 127), 2-dimethylamino-2-(4-methylbenzyl)-1-(4-morpholin-4-ylphenyl)-butanone (available as Ciba IRGACURE® 379), titanocenes, isopropylthioxanthenones, 1-hydroxy-cyclohexylphenylketone, benzophenone, 2,4,6-trimethylbenzophenone, 4-methylbenzophenone, diphenyl-(2,4,6-trimethylbenzoyl) phosphine oxide, 2,4,6-trimethylbenzoylphenylphosphinic acid ethyl ester, oligo(2-hydroxy-2-methyl-1-(4-(1-methylvinyl)phenyl) propanone), 2-hydroxy-2-methyl-1-phenyl-1-propanone, benzyl-dimethylketal, and the like, as well as mixtures thereof. In an embodiment, the ink contains an α-amino ketone, such as, for example, IRGACURE® 379 (Ciba Specialty Chemicals), 2-hydroxy-1-(4-(4-(2-hydroxy-2-methylpropionyl)-benzyl)-phenyl)-2-methylpropan-1-one, such as, for example, IRGACURE® 127 (Ciba Specialty Chemicals), bis(2,4,6-trimethylbenzoyl)-phenylphosphineoxide, such as, for example, IRGACURE® 819 and 2-isopropyl-9H-thioxanthen-9-one, such as, for example, DAROCUR® ITX (Ciba Specialty Chemicals).

Mention may also be made of amine synergists, i.e., co-initiators that donate a hydrogen atom to a photoinitiator and thereby form a radical species that initiates polymerization (amine synergists can also consume oxygen dissolved in the ink—as oxygen inhibits free radical polymerization its consumption increases the speed of polymerization), such as ethyl-4-dimethylaminobenzoate and 2-ethylhexyl-4-dimethylaminobenzoate.

In other embodiments, the initiator can be a cationic initiator. Examples of suitable cationic photoinitiators include aryldiazonium salts, diaryliodonium salts, triarysulfonium salts, triarylselenonium salts, dialkylphenacylsulfonium salts, triarylsulphoxonium salts and aryloxydiarylsulfonium salts.

Initiators that absorb radiation, for example UV light radiation, to initiate curing of the curable components of the ink may be used. Initiators for inks disclosed herein can absorb radiation at any desired or effective wavelength, for example in one embodiment from about 200 to about 600 nanometers, and in one embodiment about 200 to about 500 nanometers, and in another embodiment about 200 to about 420 nanometers. Curing of the ink can be effected by exposure of the ink image to actinic radiation for any desired or effective period of time, in one embodiment from about 0.01 second to about 30 seconds, in another embodiment from about 0.01 second to about 15 seconds, and in yet another embodiment from about 0.01 second to about 5 seconds. By curing is meant that the curable compounds in the ink undergo an increase in molecular weight upon exposure to actinic radiation, such as crosslinking, chain lengthening, or the like.

These lists are not exhaustive, and any known photoinitiator that initiates the free radical or cationic reaction upon exposure to a desired wavelength of radiation such as UV light can be used without limitation.

The total amount of initiator included in the ink may be, for example, about 0.5 to about 15%, such as about 1 to about 10%, by weight of the ink.

The radiation curable phase change inks can also optionally contain an antioxidant. The optional antioxidants can protect the images from oxidation and can also protect the ink components from oxidation during the heating portion of the ink preparation process. Specific examples of suitable antioxidant stabilizers include, for example, NAUGARD® 524, NAUGARD® 635, NAUGARD® A, NAUGARD® L-403, and NAUGARD® 959, commercially available from Crompton Corporation, Middlebury, Conn.; IRGANOX® 1010 and IRGASTAB® UV 10, commercially available from Ciba Specialty Chemicals; GENORAD 16 and GENORAD 40) commercially available from Rahn AG, Zurich, Switzerland, and the like, as well as mixtures thereof. When present, the optional antioxidant is present in the ink in any desired or effective amount, for example in one embodiment at least about 0.01 percent by weight of the ink carrier, in another embodiment at least about 0.1 percent by weight of the ink carrier, and in yet another embodiment at least about 1 percent by weight of the ink carrier, and in one embodiment no more than about 20 percent by weight of the ink carrier, in another embodiment no more than about 5 percent by weight of the ink carrier, and in yet another embodiment no more than about 3 percent by weight of the ink carrier.

The radiation curable phase change inks can also, if desired, contain additives to take advantage of the known functionality associated with such additives. Such additives may include, for example, defoamers, slip and leveling agents, pigment dispersants, and the like, as well as mixtures thereof. The inks can also include additional monomeric or polymeric materials as desired.

In particular embodiments, the radiation curable gel based phase change ink is liquid at temperatures greater than about 75° C. At those temperatures, the phase change ink may have a viscosity of less than about 10 to about 20 millipascal-seconds (mPa·s). In other embodiments, the radiation curable gel based phase change ink has a viscosity of no more than about 20 mPa·s at a temperature between about 60° C. and about 100° C. and a viscosity of at least $10^4$ mPa·s at a temperature of about 50° C. or below. In other embodiments, the phase change ink changes its viscosity by a factor of at least $10^4$ over a temperature range of from about 10° C. to about 50° C.

The phase change ink compositions generally have a jetting temperature from about 40° C. to 125° C., in one embodiment from about 50° C. to about 125° C., in another embodiment from about 60° C. to about 120° C., and in yet another embodiment from about 70° C. to about 110° C.

In one specific embodiment, the inks are jetted at low temperatures, in particular at temperatures below about 110° C., in one embodiment from about 40° C. to about 110° C., in another embodiment from about 50° C. to about 110° C., and in yet another embodiment from about 60° C. to about 90° C. At such low jetting temperatures, the conventional use of temperature differential between the jetted ink and the substrate upon which the ink is jetted to effect a rapid phase change in the ink (that is, from liquid to solid) may not be effective. The gellant can thus be used to affect a rapid viscosity increase in the jetted ink upon the substrate. In particular, jetted ink droplets can be pinned into position on the substrate through the action of a phase change transition in which the ink undergoes a significant viscosity change from a liquid state to a gel state (or semi-solid state).

In some embodiments, the temperature at which the ink forms the gel state is any temperature below the jetting temperature of the ink, in one embodiment any temperature that is about 5° C. or more below the jetting temperature of the ink. In one embodiment, the gel state can be formed as the temperature drops at a temperature of at least about 25° C., and in another embodiment at a temperature of at least about 30° C., and in one embodiment of no more than about 100° C., in another embodiment of no more than about 70° C., and in yet another embodiment of no more than about 50° C., although the temperature can be outside of these ranges. A rapid and large increase in ink viscosity occurs upon cooling from the jetting temperature, at which the ink is in a liquid state, to the gel temperature, at which the ink is in the gel state. The viscosity increase is in one specific embodiment at least a $10^{2.5}$-fold increase in viscosity.

The phase change ink compositions can be prepared by any desired or suitable method. For example, the ink ingredients can be mixed together, followed by heating, to a temperature in one embodiment of from about 80° C. to about 120° C., and stirring until a homogeneous ink composition is obtained, followed by cooling the ink to ambient temperature, for example from about 20 to about 25° C. The inks are solid at ambient temperature.

The inks can be employed in apparatus for direct printing ink jet processes and in indirect (offset) printing ink jet applications. Another embodiment disclosed herein is directed to a process which comprises incorporating an ink as disclosed herein into an ink jet printing apparatus, melting the ink, and causing droplets of the melted ink to be ejected in an imagewise pattern onto a recording substrate. A direct printing process is also disclosed in, for example, U.S. Pat. No. 5,195,430, the disclosure of which is totally incorporated herein by reference. Yet another embodiment disclosed herein is directed to a process which comprises incorporating an ink as disclosed herein into an ink jet printing apparatus, melting the ink, causing droplets of the melted ink to be ejected in an imagewise pattern onto an intermediate transfer member, and transferring the ink in the imagewise pattern from the intermediate transfer member to a final recording substrate. In a specific embodiment, the intermediate transfer member is heated to a temperature above that of the final recording sheet and below that of the melted ink in the printing apparatus. An offset or indirect printing process is also disclosed in, for example, U.S. Pat. No. 5,389,958, the disclosure of which is totally incorporated herein by reference. In one specific embodiment, the printing apparatus employs a piezoelectric printing process wherein droplets of the ink are caused to be ejected in imagewise pattern by oscillations of piezoelectric elements. Inks as disclosed herein can also be employed in other hot melt printing processes, such as hot melt acoustic ink jet printing, hot melt continuous stream or deflection ink jet printing, and the like. Phase change inks as disclosed herein can also be used in printing processes other than hot melt ink jet printing processes.

Upon deposition onto the flexible substrate, the radiation curable gel based phase change ink, which was ejected from the inkjet printhead as a liquid, solidifies into a solid on the substrate. The phase transition allows for high image quality which can be achieved without the need for pinning.

Some radiation curable inks rely on free radical polymerization of the monomer in the ink. However, free radical polymerization is inhibited by the presence of oxygen. Specifically, there is a competition for free radicals between the rate of polymerization and the diffusion rate of oxygen; if oxygen can diffuse to the reactive radical faster than the radical can propagate through the polymer, little curing will take place. To increase the curing speed, such inks often require a curing zone that has greatly reduced oxygen content, i.e. inerted, typically with nitrogen. An inerted curing zone is not needed with gel based phase change inks because unlike conventional UV curable inks, the increase in viscosity of the phase change inks reduces the rate of oxygen diffusion. Nitrogen inertion is thus required for the conventional UV inks to reduce the rate of oxygen diffusion to enable curing at high throughput. However the phase change ink increases in viscosity as a compact film on impingement onto the substrate, reducing the rate of oxygen diffusion and its subsequent inhibition of radical cure. Thus, the gel based phase change inks do not require nitrogen inertion to achieve high throughput curing.

Thus, printing on a flexible packaging substrate may comprise providing and heating a radiation-curable gel based phase change ink. Heating the phase change ink generally causes the ink to become liquid. The ink is then deposited from a printhead onto a flexible packaging substrate to form the desired image. Upon deposition, the ink solidifies on the substrate (due to the difference in temperature, which causes a phase change back to solid). Finally, the ink is cured in the ambient atmosphere.

For example, the phase change ink may be heated to temperatures sufficient to cause the ink to become a liquid. In embodiments, that temperature is generally from about 70° C. to about 95° C. or above. Alternatively, the phase change ink is heated until it attains a low viscosity, such as from about 5 to about 15 millipascal-seconds (mPa·s). The phase change ink may then be cured using any radiation source. Generally, however, the phase change ink is ultraviolet-curable.

Previous studies with emulsion-aggregation toners and other printing systems have shown that well formed halftone spots with sharp, well defined edges produce higher image sharpness, resolution, and uniformity than poorly formed halftone spots. Because the phase change inks used in the present disclosure reduce bleeding and lateral spreading to provide well-formed stable dots, higher image quality is achieved.

A device for printing on a flexible packaging substrate is also provided. A flexible packaging substrate is generally passed through the device as a web. The device comprises an unwind roll, a rewind roll, and a drive for moving the substrate. The device further comprises a printing assembly. The printing assembly is configured to deposit the radiation curable gel based phase change ink upon the flexible packaging substrate. The printing assembly comprises a heat source and a printhead. The heat source is configured to heat the phase change ink to a liquid state. The printhead ejects or deposits the liquid ink onto the flexible packaging substrate. In particular, the printhead may be a piezoelectric printhead. Notably, the device is not configured to expose the flexible packaging substrate to UV light immediately after depositing the ink. Such exposure (i.e., pinning) is not necessary as the phase change ink will not bleed or run.

The device also comprises a curing zone. Located in the curing zone is a radiation source for curing the ink. An example of a radiation source is an ultraviolet light source. In particular, the curing zone does not need to be configured to provide an inert atmosphere, such as with nitrogen. In experiments, the gel based phase change inks have been fully cured at throughput speeds greater than 200 fpm.

FIG. 1 is one embodiment of a printing system of the present disclosure. The system 10 allows a flexible packaging substrate 20 to move through several printing stations and results in a flexible packaging substrate with a printed image 30. The system 10 includes a transport system 40, that moves the flexible substrate. The transport system 40 includes an unwind roll 42, where the flexible substrate is supplied as a roll. The flexible substrate 20 is connected to rewind roll 44, which takes up the substrate after it is printed upon. A drive 46 provides a motive force to the substrate. The drive may be, for example, a drive nip formed by two rollers. The substrate 20 moves through a printing assembly which prints an image onto the substrate. Here, the assembly has five color zones 50, 60, 70, 80, 90 which print white, magenta, yellow, cyan, and black ink, respectively. Located in each color zone are printheads 100 which eject or deposit the ink onto the substrate. The substrate then passes through curing zone 110 which contains a radiation source for curing the ink. Exemplary radiation sources include electron beams or ultraviolet light. In contrast, an ink printing system using conventional UV curable inks for printing onto flexible packaging substrates would need pinning lamps between each of the color printing zones, 50, 60, 70, 80, and 90.

The devices and methods of the present disclosure are useful in several imaging applications. Those applications include: (1) printing color images onto flexible packaging substrates for short run length applications rather than using more costly analog technologies such as flexographic, gravure, or lithographic printing; (2) imprinting, or the printing of repetitive multi-line alphanumeric characters (e.g., an ingredient list); (3) labeling, or the replacement of an affixed label by printing the content of the label directly onto the flexible substrate; (4) replacement printing, or the printing of images that are usually done with analog technologies such as flexographic, gravure, or lithographic printing; (5) imaging, or the printing of non-alphanumeric graphics (such as logos); (6) graphics, which use continuous tones or half tones to reproduce an image; (7) spot coloring, or single colors printed for highlight or background purposes; (8) proofing, a prepared representation of an expected finished product, and (9) printing of personalized packaging with variable data printed on each package and targeting a specific customer or buyer for the packaged goods. Some of these applications may overlap and are not mutually exclusive.

The processes of the present disclosure are generally applicable to flexible packaging substrates, including polyester, polypropylene, and aluminum foil substrates, laminates of plastic and metal foil, and laminates of plastic and foil with paper.

The following examples are for purposes of further illustrating the present disclosure. The examples are merely illustrative and are not intended to limit devices made in accordance with the disclosure to the materials, conditions, or process parameters set forth therein. All parts are percentages by volume unless otherwise indicated.

EXAMPLES

Example 1

The ultraviolet-curable gel based phase change ink was formulated as follows: an amide gellant (16.88 g), Unilin 350-acrylate (prefiltered to 2 μm, 11.25 g), propoxylated neopentyl glycol diacrylate (142.88 g, SR9003, obtained from Sartomer Co. Inc., Exton, Pa.), 2-dimethylamino-2-(4-methylbenzyl)-1-(4-morpholin-4-ylphenyl)-butanone (6.75 g, IRGACURE® 379, obtained from Ciba Specialty Chemicals, Tarrytown, N.Y.), isopropyl-9H-thioxanthen-9-one (4.50 g, DAROCUR® ITX, obtained from Ciba Specialty Chemicals, Tarrytown, N.Y.), bis(2,4,6-trimethylbenzoyl)-phenyl-phosphine oxide (2.25 g, IRGACURE® 819, obtained from Ciba Specialty Chemicals, Tarrytown, N.Y.), 2-hydroxy-1-(4-(4-(2-hydroxy-2-methylpropionyl)-benzyl)-phenyl)-2-methylpropan-1-one (7.88 g, IRGACURE® 127, obtained from Ciba Specialty Chemicals, Tarrytown, N.Y.), and IRGASTAB® UV10 (0.45 g, obtained from Ciba Specialty Chemicals, Tarrytown, N.Y.) were stirred at 90° C. for 2 hours, after which time the solutions were filtered to 0.22 micrometers at 85° C. The resulting solution was added to a stirring solution of cyan pigment dispersion (32.18 g, 21 wt % pigment), also at 90° C., and the resulting ink was stirred for 2 hours at 90° C. The ink was filtered to 6 micrometers at 85° C.

Example 2

The ink of Example 1 was printed on a variety of media. The media were: (a) Xerox Color Xpressions Plus™ plain paper; (b) McCoy Gloss Text coated paper; (c) Melinex™ 813 (polyester of 12 microns thickness); (d) aluminum foil (40 microns thick); and (e) OPPalyte™ ASW 250 (polypropylene of 43 microns thickness). As comparison, a conventional low viscosity UV-curable cyan ink obtained from a well known UV curable ink manufacturer was used. The UV gel and the conventional low viscosity ink were printed from a piezoelectric printhead directly onto the substrate without pinning. The ink drops were ~21 nanograms each, printed at 150 dots per inch (dpi) in the cross process direction, and at 200 dpi in the process direction. For the phase change ink of Example 1, the printhead was heated at 75° C. For the conventional low viscosity ink, the printhead was heated at 45° C.

Figure 2:
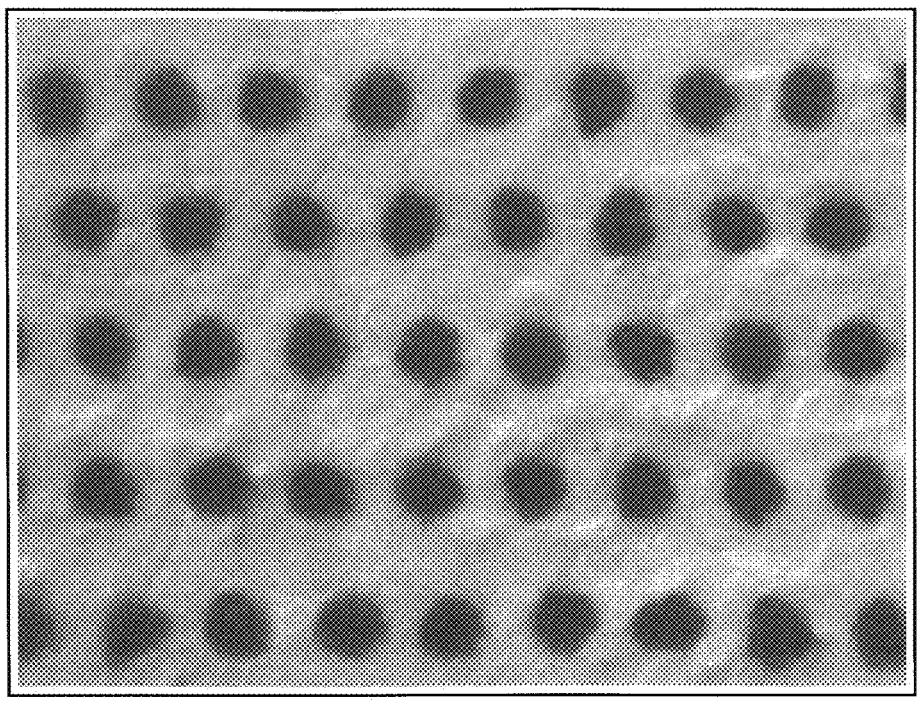
FIG. 2 is a color photograph of a UV gel phase change ink printed on plain paper.
Figure 3:
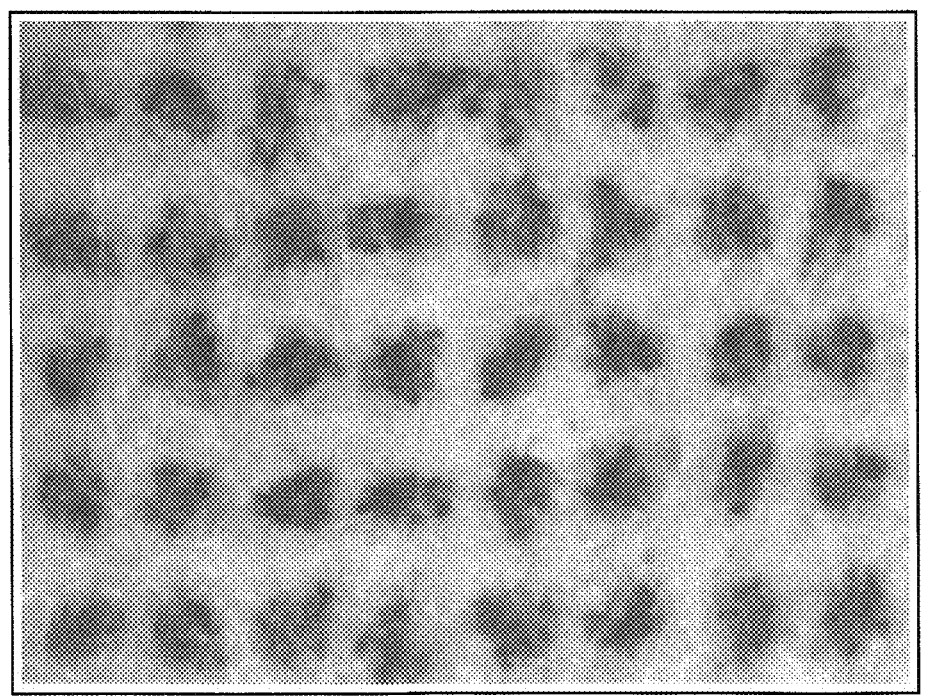
FIG. 3 is a color photograph of a conventional UV-curable ink printed on plain paper.

FIG. 2 is the phase change ink printed on plain paper. FIG. 3 is the conventional low viscosity ink printed on plain paper.

Figure 4:
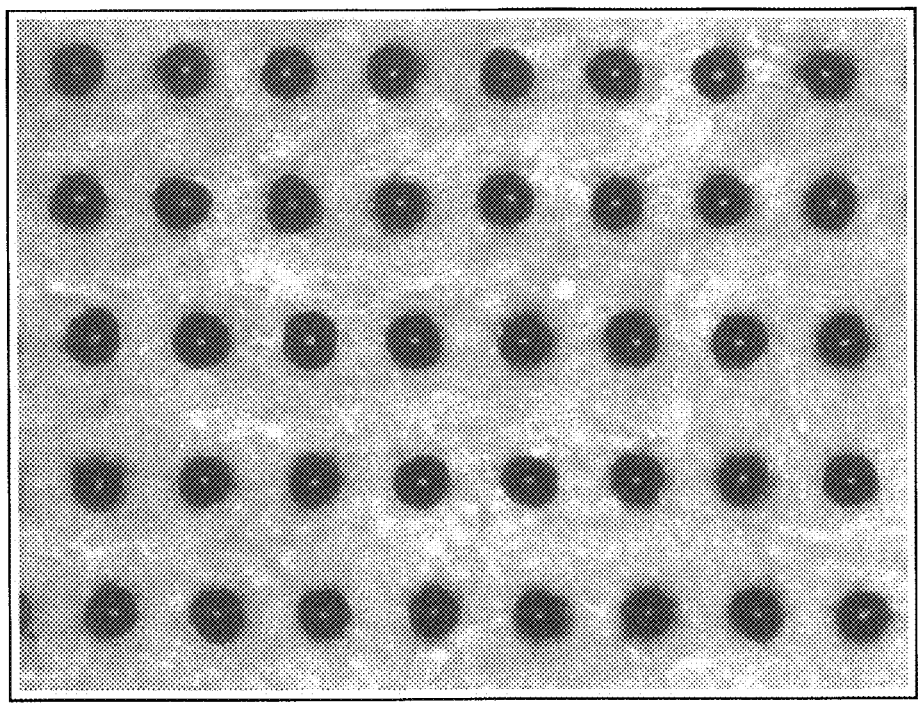
FIG. 4 is a color photograph of a UV gel phase change ink printed on glossy paper.
Figure 5:
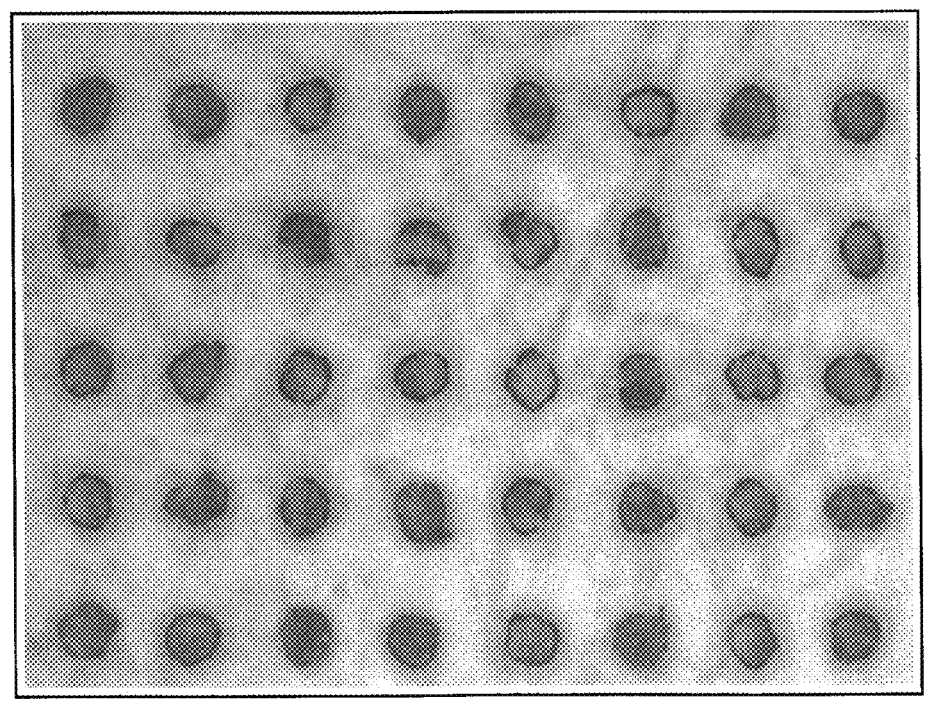
FIG. 5 is a color photograph of a conventional UV-curable ink printed on glossy paper.

FIG. 4 is the phase change ink printed on glossy paper. FIG. 5 is the conventional low viscosity ink printed on glossy paper.

Figure 6:
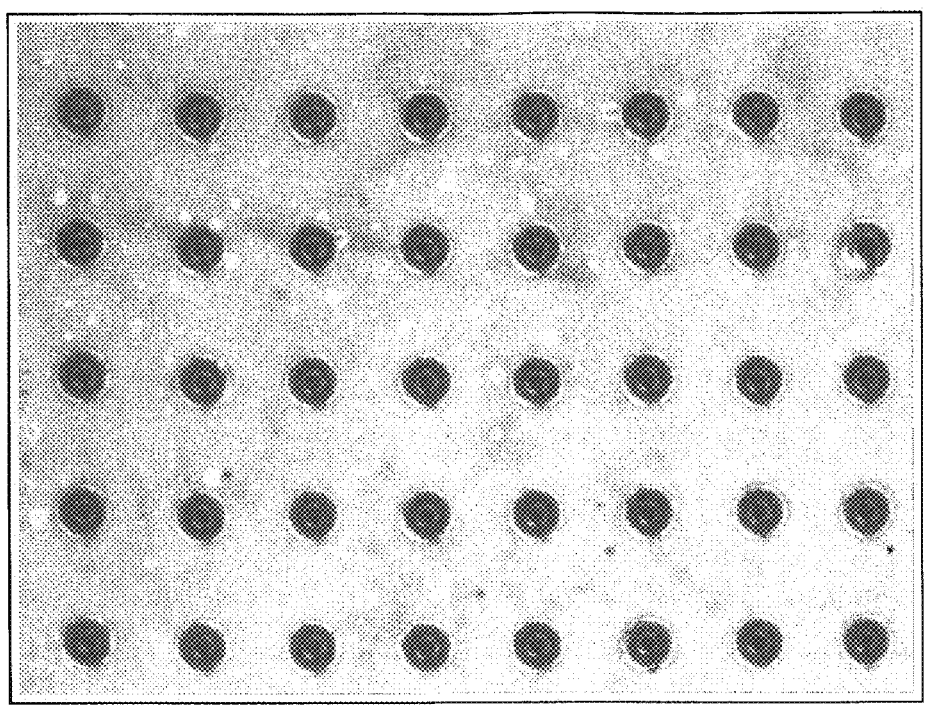
FIG. 6 is a color photograph of a UV gel phase change ink printed on polyester substrate.
Figure 7:
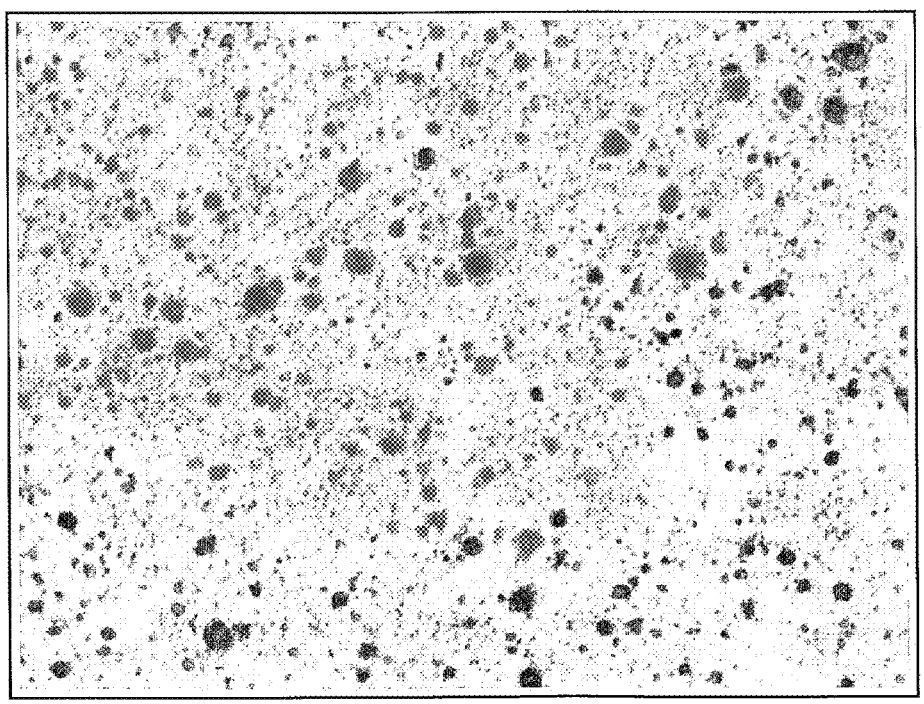
FIG. 7 is a color photograph of a conventional UV-curable ink printed on polyester substrate.

FIG. 6 is the phase change ink printed on polyester substrate. FIG. 7 is the conventional low viscosity ink printed on polyester substrate.

Figure 8:
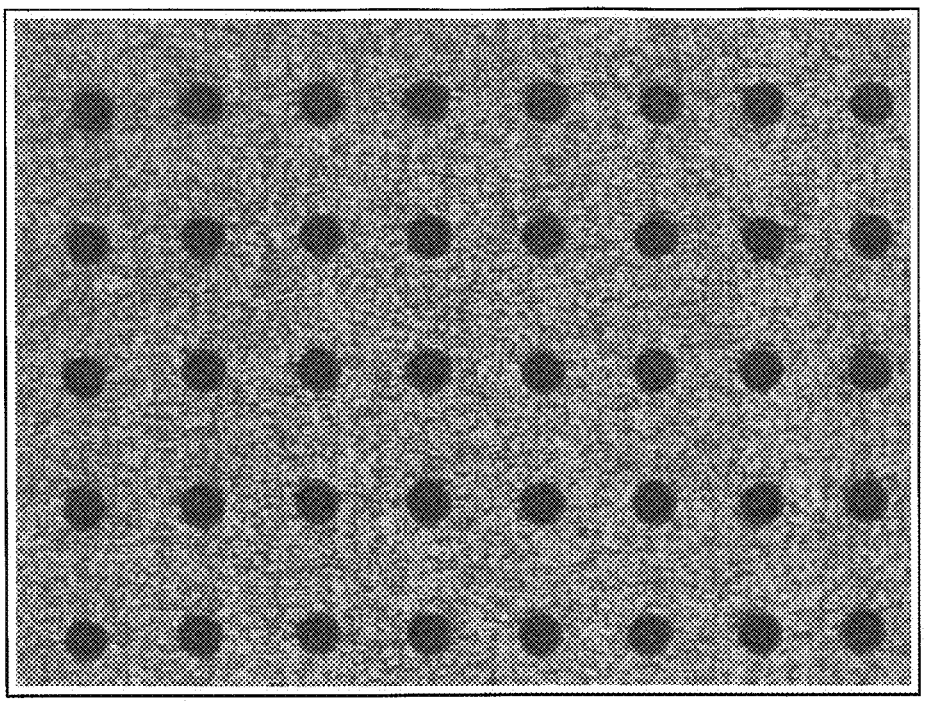
FIG. 8 is a color photograph of a UV gel phase change ink printed on aluminum substrate.
Figure 9:
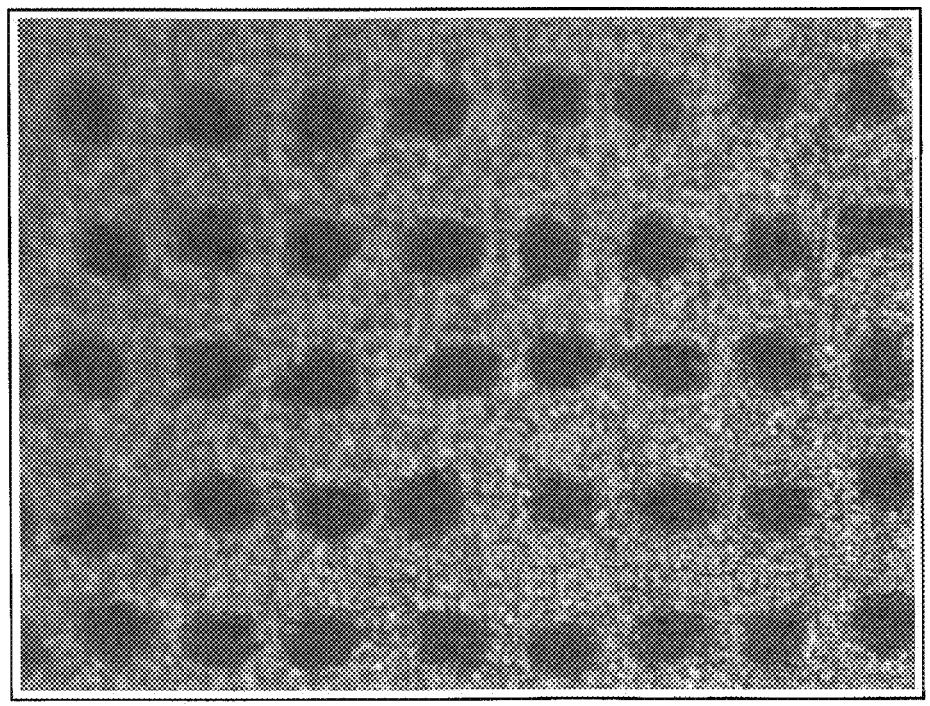
FIG. 9 is a color photograph of a conventional UV-curable ink printed on aluminum substrate.

FIG. 8 is the phase change ink printed on aluminum substrate. FIG. 9 is the conventional low viscosity ink printed on aluminum substrate.

Figure 10:
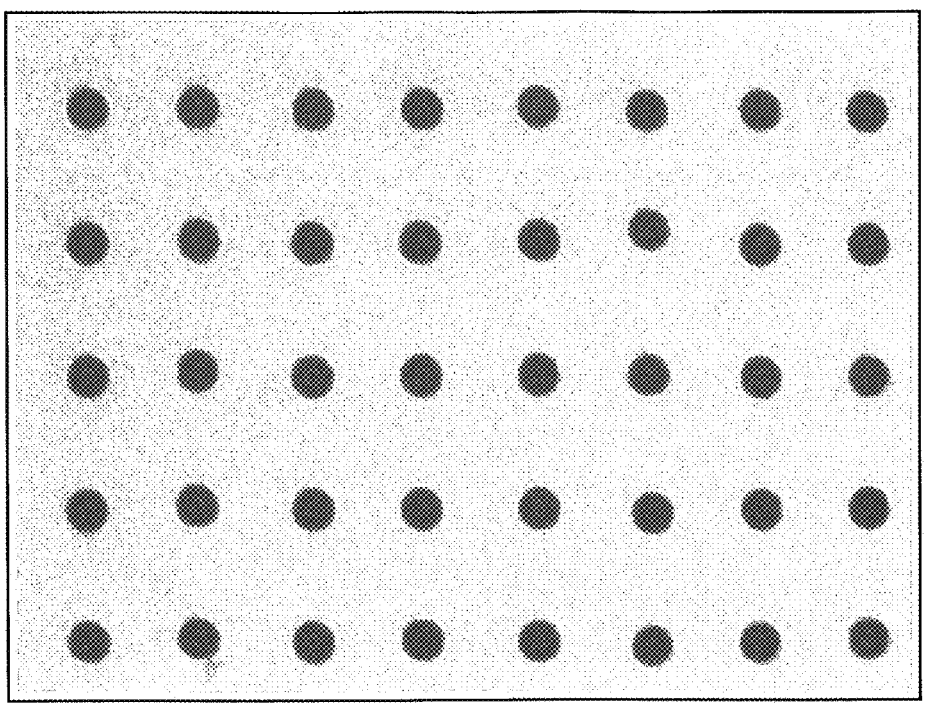
FIG. 10 is a color photograph of a UV gel phase change ink printed on polypropylene substrate.
Figure 11:
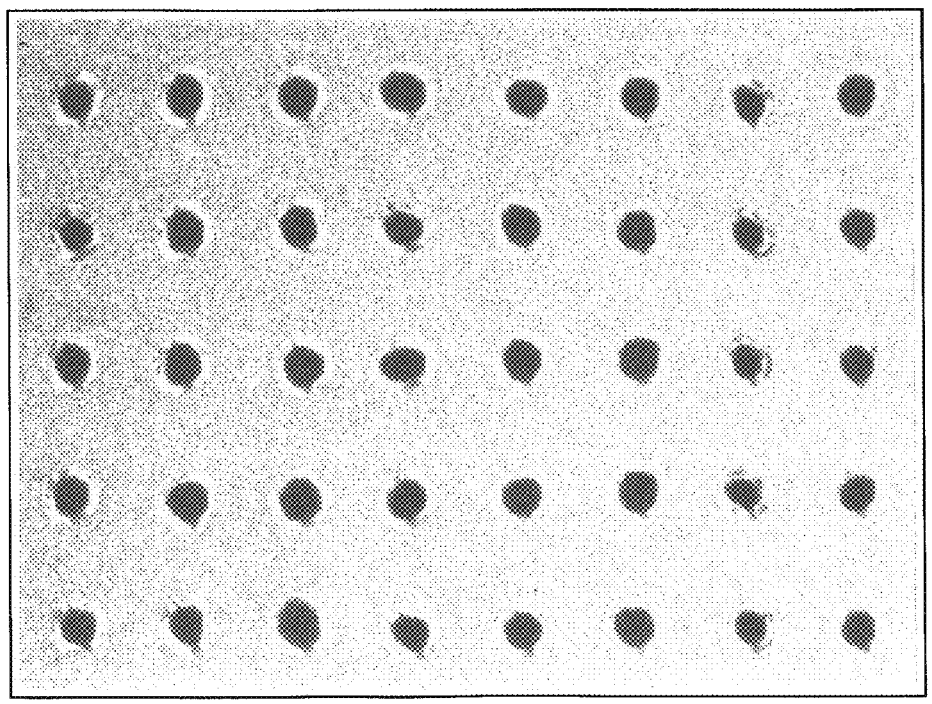
FIG. 11 is a color photograph of a conventional UV-curable ink printed on polypropylene substrate.

FIG. 10 is the phase change ink printed on polypropylene substrate. FIG. 11 is the conventional low viscosity ink printed on polypropylene substrate.

As can be seen, the phase change ink formed well defined spots on all of the substrates. There was virtually no spreading on the flexible polyester, aluminum, and polypropylene substrates and minimal spreading on the glossy paper and plain paper. However, in both of these cases a well defined circular spot structure was maintained. Spreading is measured in terms of the area covered by the final ink spot, compared to the area covered by the ink spot when initially deposited.

The conventional low viscosity ink on polypropylene showed visible lateral weeping, i.e. where a component of the ink spot separated from the rest of the ink formulation. The conventional low viscosity ink on aluminum showed substantial irregular lateral spreading. The conventional low viscosity ink on polyester appeared to spread, join with neighboring printed spots, and uniformly wet the substrate in the region of printing. On glossy paper, the conventional low viscosity ink showed significant lateral spreading with the formation of "coffee stain" rings at the edges of the spread drops. On plain paper, there was a large amount of spreading and the spots were irregularly shaped.

In summary, the phase change inks have improved overall image quality.

Example 3

Two phase change inks, one cyan and one magenta, were formulated and printed on the five substrates. Three lines were printed. The top line was the cyan ink, the middle line was the magenta ink, and the bottom line was either printed (i) with the magenta ink on top of the cyan ink to form blue; or (ii) with the cyan ink by itself. All images were then cured with an in-line UV curing lamp. The appearance of the colors is slightly affected by the substrate on which it is printed.

Figures 12, 13, 14:
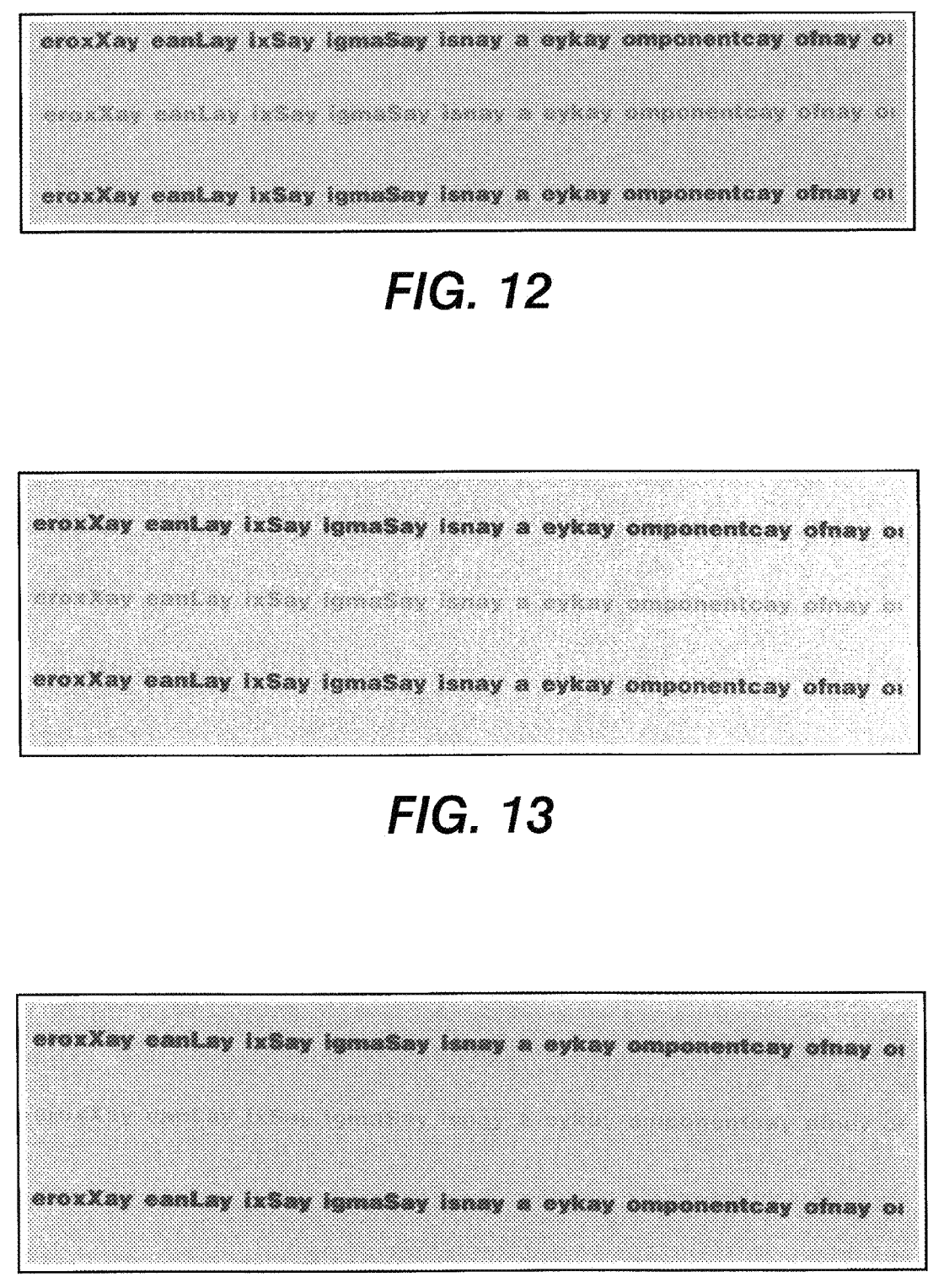

FIG. 12 shows the phase change inks printed on plain paper, with the top line cyan, the middle line magenta, and the bottom line cyan.

FIG. 13 shows the phase change inks printed on glossy paper, with the top line cyan, the middle line magenta, and the bottom line blue.

FIG. 14 shows the phase change inks printed on polyester substrate, with the top line cyan, the middle line magenta, and the bottom line blue.

Figures 15, 16:
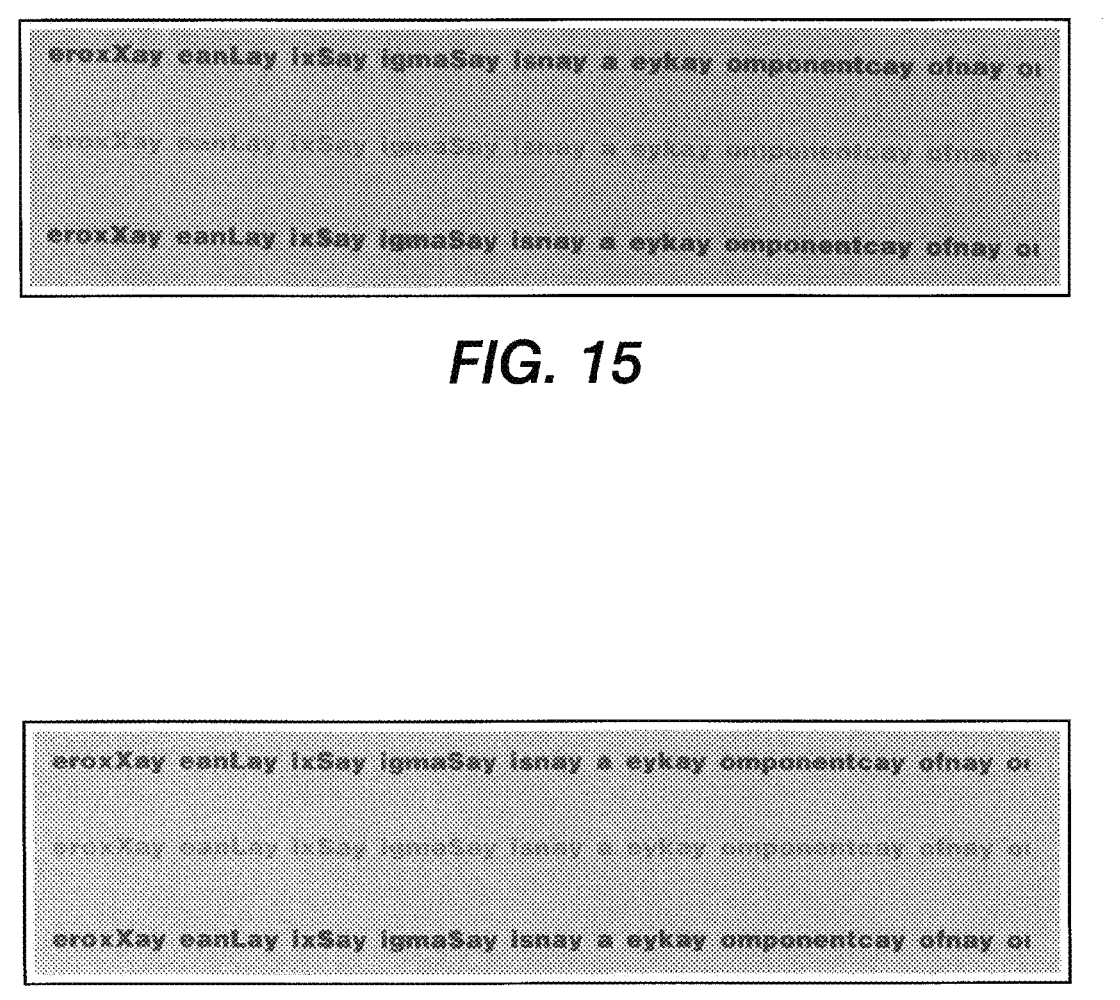

FIG. 15 shows the phase change inks printed on aluminum substrate, with the top line cyan, the middle line magenta, and the bottom line cyan.

FIG. 16 shows the phase change inks printed on polypropylene substrate, with the top line cyan, the middle line magenta, and the bottom line cyan.

When the secondary colors were printed with the magenta ink on top of the cyan ink to form blue, the text was still sharp without blurring or ink spreading. The registration was good.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

The invention claimed is:

1. A method for forming an image on a flexible packaging substrate comprising:
   melting a radiation-curable gel based phase change ink;
   depositing at least one drop of the melted ink on the flexible packaging substrate in a pattern to form an image;
   allowing the ink to gel on the substrate; and
   curing the ink;
   wherein the ink comprises a radiation-curable monomer, a colorant, and at least one gellant which can undergo a change of viscosity of at least $10^5$ centipoise over a temperature range of at least 30° C.

2. The method of claim 1, wherein the ink is cured in an ambient atmosphere.

3. The method of claim 1, wherein the ink is cured by exposing the ink to ultraviolet light.

4. The method of claim 1, wherein the ink is heated until the ink has a viscosity of from about 5 to about 15 millipascal-seconds.

5. The method of claim 1, wherein the ink is heated to a temperature of from about 70° C. to about 95° C.

6. The method of claim 1, wherein the flexible packaging substrate comprises a metal foil, a plastic film, paper, and laminates thereof.

7. The method of claim 1, wherein the flexible packaging substrate comprises aluminum foil, polyester film, or polypropylene film.

8. The method of claim 1, wherein the radiation-curable gel based phase change ink does not contain a photoinitiator; and the ink is cured by exposing the ink to electron beam radiation.

9. The image on a flexible substrate formed by the method of claim 1.

10. A method for forming an image on a flexible packaging substrate comprising:
    heating an actinic radiation-curable gel based phase change ink to form a liquid;
    depositing one or more droplets of the liquid ink onto a flexible packaging substrate in an imagewise pattern;
    allowing the liquid ink of the imagewise pattern to solidify to form a gel; and
    curing the actinic radiation-curable gel ink;
    wherein the ink comprises a gellant of one of the following formulas:

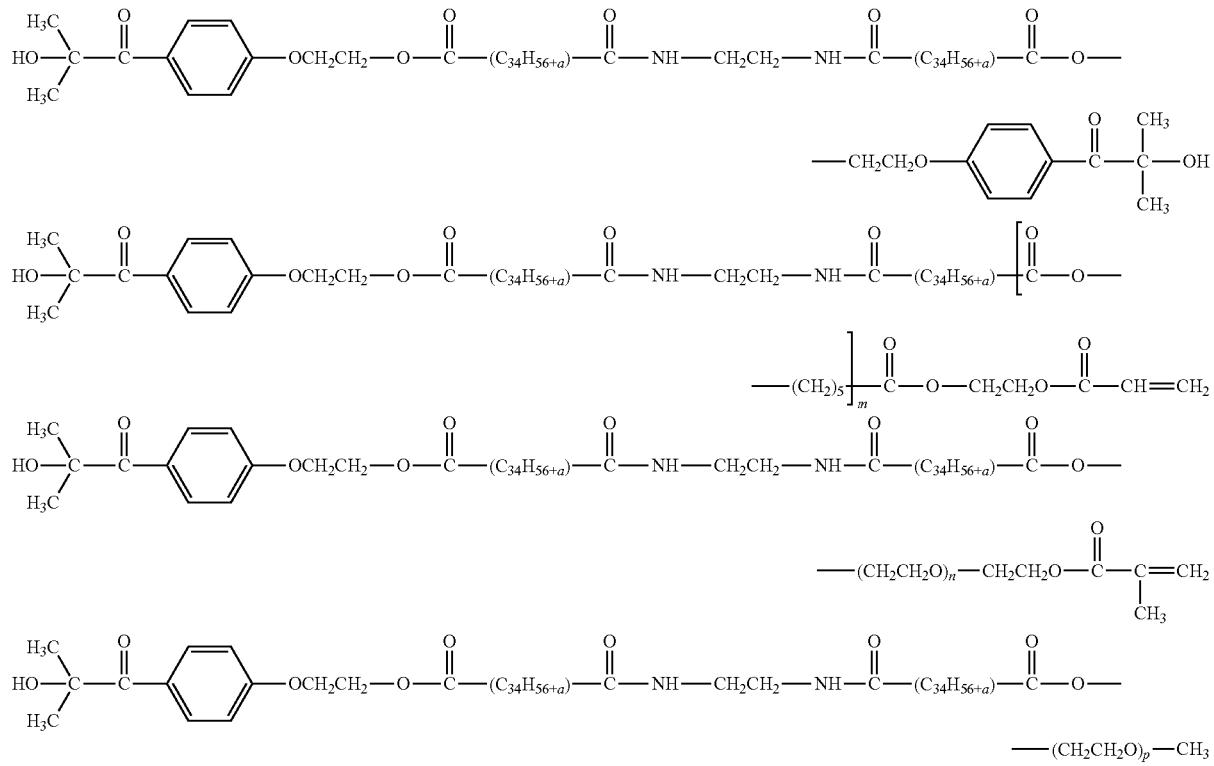

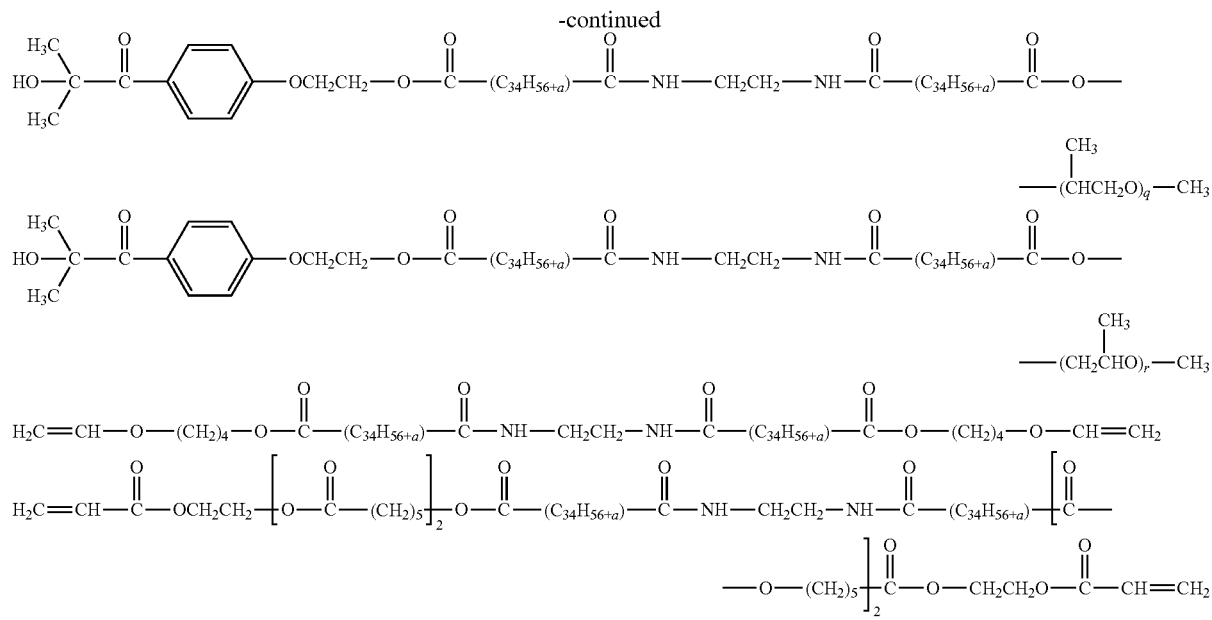

-continued wherein —$C_{34}H_{56+a}$— represents a branched alkylene group, wherein a is an integer from 0 to 12, and wherein m, n, p, q, and r are each independently an integer from 2 to 5.

11. The method of claim 10, wherein the ink is cured by exposing the ink to ultraviolet light.

12. The method of claim 10, wherein the ink is heated until the ink has a viscosity of from about 5 to about 15 millipascal-seconds.

13. The method of claim 10, wherein the ink is heated to a temperature of from about 70° C. to about 95° C.

14. The method of claim 10, wherein the flexible packaging substrate comprises aluminum foil, polyester film, or polypropylene film.

15. The method of claim 10, wherein the flexible packaging substrate comprises a metal foil, a plastic film, paper and laminates thereof.

16. The method of claim 10, wherein the radiation-curable gel based phase change ink does not contain a photoinitiator; and the ink is cured by exposing the ink to electron beam radiation.

17. The image on a flexible packaging substrate formed by the method of claim 10.

* * * * *

UNITED STATES PATENT AND TRADEMARK OFFICE
CERTIFICATE OF CORRECTION

| | | |
|---|---|---|
| PATENT NO. | : 7,887,176 B2 | Page 1 of 1 |
| APPLICATION NO. | : 12/121386 | |
| DATED | : February 15, 2011 | |
| INVENTOR(S) | : Gregory Joseph Kovacs et al. | |

It is certified that error appears in the above-identified patent and that said Letters Patent is hereby corrected as shown below:

Title Page
(73) Assignees should read:  Xerox Corporation, Norwalk, CT (US)
                             Palo Alto Research Center Incorporated, Palo Alto, CA (US)

Signed and Sealed this
Fourteenth Day of June, 2011

David J. Kappos
*Director of the United States Patent and Trademark Office*